(12) United States Patent
Krein

(10) Patent No.: US 9,467,063 B2
(45) Date of Patent: Oct. 11, 2016

(54) TECHNOLOGIES FOR INTERLEAVED CONTROL OF AN INVERTER ARRAY

(75) Inventor: Philip Krein, Champaign, IL (US)

(73) Assignee: SunPower Corporation, San Jose, CA (US)

( * ) Notice: Subject to any disclaimer, the term of this patent is extended or adjusted under 35 U.S.C. 154(b) by 213 days.

(21) Appl. No.: 12/955,894

(22) Filed: Nov. 29, 2010

(65) Prior Publication Data

US 2012/0134189 A1     May 31, 2012

(51) Int. Cl.
| | | |
|---|---|---|
| *H02M 7/49* | (2007.01) | |
| *H02M 7/42* | (2006.01) | |
| *H02M 7/51* | (2006.01) | |

(52) U.S. Cl.
CPC ............. *H02M 7/49* (2013.01); *H02M 7/42* (2013.01); *H02M 7/51* (2013.01)

(58) Field of Classification Search
CPC ....................................................... H02M 7/49
USPC ....... 323/272, 282, 299, 283, 268, 265, 271; 363/109, 15, 34, 71, 132, 89, 49, 55, 363/50; 307/80, 82
See application file for complete search history.

(56) References Cited

U.S. PATENT DOCUMENTS

| | | |
|---|---|---|
| 3,670,230 A | 6/1972 | Rooney et al. |
| 4,114,048 A | 9/1978 | Hull |
| 4,217,633 A | 8/1980 | Evans |
| 4,277,692 A | 7/1981 | Small |
| 4,287,465 A | 9/1981 | Godard et al. |

(Continued)

FOREIGN PATENT DOCUMENTS

| | | |
|---|---|---|
| CA | 2353422 C | 3/2004 |
| CA | 2655007 A1 | 8/2010 |

(Continued)

OTHER PUBLICATIONS

Kutkut, "PV Energy Conversion and System Integration," Florida Energy Systems Consortium, 2009, 24 pages.

(Continued)

*Primary Examiner* — Matthew Nguyen
*Assistant Examiner* — Trinh Dang
(74) *Attorney, Agent, or Firm* — Barnes & Thornburg LLP

(57) ABSTRACT

An apparatus to deliver an alternating current (AC) power may include a controller having a processor and a memory. The apparatus may also include a plurality of power inverters in communication with the controller. Each power inverter may be configured to convert direct-current (DC) power into the (AC) power. Each of the plurality of power inverters may be configured to be controlled by the controller to generate AC power below at least one predetermined operating threshold. The plurality of power inverters may be configured to combine AC power generated by each of the plurality of power inverters, such that the combined AC power is delivered to a common AC load above the predetermined operating threshold. The apparatus may be arranged and operated according to a ratio of $FMA=F_r/N$, where $F_r=f_s/f_l$, $f_s$ is the switching frequency of the plurality of power inverters, $f_l$ is the frequency of the common AC load, and N is the number of power inverters of the apparatus.

26 Claims, 16 Drawing Sheets

(56) References Cited

U.S. PATENT DOCUMENTS

| | | | |
|---|---|---|---|
| 4,651,265 A | 3/1987 | Stacey et al. |
| 4,661,758 A | 4/1987 | Whittaker |
| 4,707,774 A | 11/1987 | Kajita |
| 4,709,318 A | 11/1987 | Gephart et al. |
| 4,719,550 A | 1/1988 | Powell et al. |
| 4,725,740 A | 2/1988 | Nakata |
| 5,041,959 A | 8/1991 | Walker |
| 5,148,043 A | 9/1992 | Hirata et al. |
| 5,160,851 A | 11/1992 | McAndrews |
| 5,191,519 A | 3/1993 | Kawakami |
| 5,309,073 A | 5/1994 | Kaneko et al. |
| 5,343,380 A | 8/1994 | Champlin |
| 5,473,528 A | 12/1995 | Hirata |
| 5,668,464 A | 9/1997 | Krein |
| 5,684,385 A | 11/1997 | Guyonneau et al. |
| 5,721,481 A | 2/1998 | Narita et al. |
| 5,745,356 A | 4/1998 | Tassitino |
| 5,796,182 A | 8/1998 | Martin |
| 5,801,519 A | 9/1998 | Midya et al. |
| 5,886,890 A | 3/1999 | Ishida et al. |
| 5,896,281 A * | 4/1999 | Bingley | 363/71 |
| 5,929,537 A | 7/1999 | Glennon |
| 5,978,236 A | 11/1999 | Faberman et al. |
| 5,982,645 A | 11/1999 | Levran et al. |
| 6,046,402 A | 4/2000 | More |
| 6,154,379 A | 11/2000 | Okita |
| 6,157,168 A | 12/2000 | Malik |
| 6,180,868 B1 | 1/2001 | Yoshino et al. |
| 6,201,180 B1 | 3/2001 | Meyer et al. |
| 6,201,319 B1 | 3/2001 | Simonelli et al. |
| 6,225,708 B1 | 5/2001 | Furukawa |
| 6,259,017 B1 * | 7/2001 | Takehara et al. | 307/82 |
| 6,268,559 B1 | 7/2001 | Yamawaki |
| 6,285,572 B1 | 9/2001 | Onizuka et al. |
| 6,291,764 B1 | 9/2001 | Ishida et al. |
| 6,311,279 B1 | 10/2001 | Nguyen |
| 6,356,471 B1 | 3/2002 | Fang |
| 6,369,461 B1 | 4/2002 | Jungreis et al. |
| 6,381,157 B2 | 4/2002 | Jensen |
| 6,445,089 B1 | 9/2002 | Okui |
| 6,462,507 B2 | 10/2002 | Fisher |
| 6,489,755 B1 | 12/2002 | Boudreaux et al. |
| 6,563,234 B2 | 5/2003 | Hasegawa et al. |
| 6,605,881 B2 | 8/2003 | Takehara et al. |
| 6,614,132 B2 | 9/2003 | Hockney et al. |
| 6,624,533 B1 | 9/2003 | Swanson |
| 6,657,321 B2 | 12/2003 | Sinha |
| 6,700,802 B2 | 3/2004 | Ulinski et al. |
| 6,727,602 B2 | 4/2004 | Olson |
| 6,750,391 B2 | 6/2004 | Bower et al. |
| 6,765,315 B2 | 7/2004 | Hammerstrom |
| 6,770,984 B2 | 8/2004 | Pai |
| 6,795,322 B2 | 9/2004 | Aihara et al. |
| 6,838,611 B2 | 1/2005 | Kondo et al. |
| 6,847,196 B2 | 1/2005 | Garabandic |
| 6,881,509 B2 | 4/2005 | Jungreis |
| 6,882,063 B2 | 4/2005 | Droppo et al. |
| 6,950,323 B2 | 9/2005 | Achleitner |
| 7,031,176 B2 | 4/2006 | Kotsopoulos et al. |
| 7,072,195 B2 | 7/2006 | Xu |
| 7,091,707 B2 * | 8/2006 | Cutler | 323/268 |
| 7,193,872 B2 | 3/2007 | Siri |
| 7,233,130 B1 | 6/2007 | Kay |
| 7,289,341 B2 | 10/2007 | Hesterman |
| 7,319,313 B2 | 1/2008 | Dickerson et al. |
| 7,324,361 B2 | 1/2008 | Siri |
| 7,339,287 B2 | 3/2008 | Jepsen et al. |
| 7,365,998 B2 | 4/2008 | Kumar |
| 7,405,494 B2 | 7/2008 | Tassitino, Jr. et al. |
| 7,420,354 B2 | 9/2008 | Cutler |
| 7,432,691 B2 | 10/2008 | Cutler |
| 7,463,500 B2 | 12/2008 | West |
| 7,502,697 B2 | 3/2009 | Holmquist et al. |
| 7,521,914 B2 | 4/2009 | Dickerson et al. |
| 7,531,993 B2 | 5/2009 | Udrea et al. |
| 7,551,460 B2 | 6/2009 | Lalithambika et al. |
| 7,577,005 B2 | 8/2009 | Angerer et al. |
| 7,592,789 B2 | 9/2009 | Jain |
| 7,609,040 B1 | 10/2009 | Jain |
| 7,626,834 B2 | 12/2009 | Chisenga et al. |
| 7,638,899 B2 | 12/2009 | Tracy et al. |
| 7,646,116 B2 | 1/2010 | Batarseh et al. |
| 7,660,139 B2 | 2/2010 | Garabandic |
| 7,667,610 B2 | 2/2010 | Thompson |
| 7,710,752 B2 | 5/2010 | West |
| 7,733,679 B2 | 6/2010 | Luger et al. |
| 7,768,155 B2 | 8/2010 | Fornage |
| 7,796,412 B2 | 9/2010 | Fornage |
| 7,808,125 B1 * | 10/2010 | Sachdeva et al. | 307/82 |
| RE41,965 E | 11/2010 | West |
| 7,839,022 B2 | 11/2010 | Wolfs |
| 7,855,906 B2 | 12/2010 | Klodowski et al. |
| RE42,039 E | 1/2011 | West et al. |
| 7,899,632 B2 | 3/2011 | Fornage et al. |
| 7,916,505 B2 | 3/2011 | Fornage |
| 2001/0043050 A1 | 11/2001 | Fisher |
| 2002/0017822 A1 | 2/2002 | Umemura et al. |
| 2002/0196026 A1 | 12/2002 | Kimura et al. |
| 2005/0213272 A1 | 9/2005 | Kobayashi |
| 2006/0067137 A1 | 3/2006 | Udrea et al. |
| 2006/0083039 A1 | 4/2006 | Oliveira et al. |
| 2007/0040539 A1 | 2/2007 | Cutler |
| 2007/0040540 A1 | 2/2007 | Cutler |
| 2007/0133241 A1 | 6/2007 | Mumtaz et al. |
| 2007/0142985 A1 * | 6/2007 | Kumar | 701/22 |
| 2007/0221267 A1 | 9/2007 | Fornage |
| 2008/0055952 A1 | 3/2008 | Chisenga et al. |
| 2008/0078436 A1 | 4/2008 | Nachamkin et al. |
| 2008/0106921 A1 | 5/2008 | Dickerson et al. |
| 2008/0164766 A1 * | 7/2008 | Adest et al. | 307/80 |
| 2008/0203397 A1 | 8/2008 | Amaratunga et al. |
| 2008/0266922 A1 | 10/2008 | Mumtaz et al. |
| 2008/0272279 A1 | 11/2008 | Thompson |
| 2008/0283118 A1 | 11/2008 | Rotzoll et al. |
| 2008/0285317 A1 | 11/2008 | Rotzoll |
| 2008/0304296 A1 | 12/2008 | NadimpalliRaju et al. |
| 2008/0315805 A1 * | 12/2008 | Kumar et al. | 318/362 |
| 2009/0000654 A1 | 1/2009 | Rotzoll et al. |
| 2009/0020151 A1 | 1/2009 | Fornage |
| 2009/0066357 A1 | 3/2009 | Fornage |
| 2009/0079383 A1 | 3/2009 | Fornage et al. |
| 2009/0080226 A1 | 3/2009 | Fornage |
| 2009/0084426 A1 | 4/2009 | Fornage et al. |
| 2009/0086514 A1 | 4/2009 | Fornage et al. |
| 2009/0097283 A1 | 4/2009 | Krein et al. |
| 2009/0147554 A1 | 6/2009 | Adest et al. |
| 2009/0160259 A1 * | 6/2009 | Naiknaware et al. | 307/82 |
| 2009/0167271 A1 * | 7/2009 | Tang et al. | 323/283 |
| 2009/0184695 A1 | 7/2009 | Mocarski |
| 2009/0200994 A1 | 8/2009 | Fornage |
| 2009/0225574 A1 | 9/2009 | Fornage |
| 2009/0230782 A1 | 9/2009 | Fornage |
| 2009/0242272 A1 | 10/2009 | Little et al. |
| 2009/0243587 A1 | 10/2009 | Fornage |
| 2009/0244929 A1 | 10/2009 | Fornage |
| 2009/0244947 A1 | 10/2009 | Fornage |
| 2009/0296348 A1 | 12/2009 | Russell et al. |
| 2010/0039039 A1 * | 2/2010 | Goriki et al. | 315/246 |
| 2010/0085035 A1 | 4/2010 | Fornage |
| 2010/0088052 A1 | 4/2010 | Yin et al. |
| 2010/0091532 A1 | 4/2010 | Fornage |
| 2010/0106438 A1 | 4/2010 | Fornage |
| 2010/0127647 A1 * | 5/2010 | Huang | H02M 3/1582 318/400.11 |
| 2010/0139945 A1 | 6/2010 | Dargatz |
| 2010/0175338 A1 | 7/2010 | Garcia Cors |
| 2010/0176771 A1 | 7/2010 | Fieldhouse et al. |
| 2010/0181830 A1 | 7/2010 | Fornage et al. |
| 2010/0195357 A1 | 8/2010 | Fornage et al. |
| 2010/0214808 A1 | 8/2010 | Rodriguez |
| 2010/0222933 A1 | 9/2010 | Smith et al. |
| 2010/0236612 A1 | 9/2010 | Khajehoddin et al. |
| 2010/0244575 A1 * | 9/2010 | Coccia et al. | 307/82 |
| 2010/0263704 A1 | 10/2010 | Fornage et al. |

(56) References Cited

U.S. PATENT DOCUMENTS

| | | | |
|---|---|---|---|
| 2010/0264736 A1* | 10/2010 | Mumtaz et al. | 307/48 |
| 2010/0283325 A1 | 11/2010 | Marcianesi et al. | |
| 2010/0309695 A1 | 12/2010 | Fornage | |
| 2010/0332065 A1* | 12/2010 | Lin et al. | 701/22 |
| 2011/0012429 A1 | 1/2011 | Fornage | |
| 2011/0019444 A1 | 1/2011 | Dargatz et al. | |
| 2011/0026281 A1 | 2/2011 | Chapman et al. | |
| 2011/0026282 A1 | 2/2011 | Chapman et al. | |
| 2011/0043160 A1 | 2/2011 | Serban | |
| 2011/0049990 A1 | 3/2011 | Amaratunga et al. | |
| 2011/0051820 A1 | 3/2011 | Fornage | |
| 2011/0130889 A1 | 6/2011 | Khajehoddin et al. | |

FOREIGN PATENT DOCUMENTS

| | | |
|---|---|---|
| CA | 2693737 A1 | 8/2010 |
| DE | 20012131 U1 | 3/2001 |
| EP | 1794799 A1 | 6/2007 |
| EP | 1803161 A1 | 7/2007 |
| EP | 1837985 A2 | 9/2007 |
| GB | 2419968 A | 5/2006 |
| GB | 2421847 A | 7/2006 |
| GB | 2439648 A | 1/2008 |
| GB | 2434490 B | 4/2009 |
| GB | 2454389 A | 5/2009 |
| GB | 2455753 A | 6/2009 |
| GB | 2455755 A | 6/2009 |
| NL | 1021582 C2 | 4/2004 |
| NL | 1021591 C2 | 4/2004 |
| WO | WO 2004008619 A2 | 1/2004 |
| WO | WO 2004100348 A1 | 11/2004 |
| WO | WO 2004100348 A8 | 12/2005 |
| WO | WO 2006048688 A1 | 5/2006 |
| WO | WO 2007080429 A2 | 7/2007 |
| WO | WO 2009081205 A2 | 7/2009 |
| WO | WO 2009081205 A3 | 10/2009 |
| WO | WO 2009134756 A1 | 11/2009 |

OTHER PUBLICATIONS

Kwon et al., "High-efficiency Module-integrated Photovoltaic Power Conditioning System," IET Power Electronics, doi: 10.1049/iet-pel. 2008.0023, 2008.

Lohner et al., "A New Panel-integratable Inverter Concept for Grid-Connected Photovoltaic Systems," IEEE ISIE '96, vol. 2, pp. 827-831, 1996.

Martins et al., "Analysis of Utility Interactive Photovoltaic Generation System Using a Single Power Static Inverter," Conference Record of the Twenty-Eighth IEEE Photovoltaic Specialists Conference, pp. 1719-1722, 2000.

Martins et al., "Interconnection of a Photovoltaic Panels Array to a Single-Phase Utility Line From a Static Conversion System," Proc. IEEE Power Electronics Specialists Conf., pp. 1207-1211, 2000.

Martins et al., "Usage of the Solar Energy from the Photovoltaic Panels for the Generation of Electrical Energy," The 21st International Telecommunication Energy Conference, 6 pages, 1999.

Matsui et al, "A New Maximum Photovoltaic Power Tracking Control Scheme Based on Power Equilibrium at DC Link," Conference Record of the 1999 IEEE Thirty-Fourth IAS Annual Meeting, vol. 2, pp. 804-809, 1999.

Meinhardt et al., "Miniaturised 'low profile' Module Integrated Converter for Photovoltaic Applications with Integrated Magnetic Components," IEEE APEC '99, vol. 1, pp. 305-311, 1999.

Meza et al., "Boost-Buck Inverter Variable Structure Control for Grid-Connected Photovoltaic Systems," IEEE International Symposium on Circuits and Systems, vol. 2, pp. 1318-1321, 2005.

Midya et al., "Dual Switched Mode Power Converter," 15th Annual Conference of IEEE Industrial Electronics Society, vol. 1, pp. 155-158, Mar. 1989.

Midya et al., "Sensorless Current Mode Control—An Observer-Based Technique for DC-DC Converters," IEEE Transactions on Power Electronics, vol. 16, No. 4, pp. 522-526, Jul. 2001.

Nikraz et al., "Digital Control of a Voltage Source Inverter in Photovoltaic Applications," 35th Annual IEEE Power Electronics Specialists Conference, pp. 3266-3271, 2004.

Oldenkamp et al., "AC Modules: Past, Present and Future, Workshop Installing the Solar Solution," Jan. 1998, Hatfield, UK, 6 pages.

Pajic et al., "Unity Power Factor Compensation for Burst Modulated Loads," IEEE Power Engineering Society General Meeting, vol. 2, pp. 1274-1277, 2003.

Ramos et al., "A Fixed-Frequency Quasi-Sliding Control Algorithm: Application to Power Inverters Design by Means of FPGA Implementation," IEEE Transactions on Power Electronics, vol. 18, No. 1, pp. 344-355, Jan. 2003.

Rodriguez et al., "Analytic Solution to the Photovoltaic Maximum Power Point Problem," IEEE Transactions on Circuits and Systems, vol. 54, No. 9, pp. 2054-2060, Sep. 2007.

Rodriguez et al., "Dynamic Stability of Grid-Connected Photovoltaic Systems," Power Engineering Society General Meeting, vol. 2, pp. 2193-2199, 2004.

Rodriguez et al., "Long-Lifetime Power Inverter for Photovoltaic AC Modules," IEEE Transaction on Industrial Electronics, vol. 55, No. 7, pp. 2593-2601, Jul. 2008.

Ropp et al., "Determining the Relative Effectiveness of Islanding Detection Methods Using Phase Criteria and Nondetection Zones," IEEE Transactions on Energy Conversion, vol. 15, No. 3, pp. 290-296, Sep. 2000.

Russell et al., "SunSine300 AC Module, Annual Report Jul. 25, 1995-Dec. 31, 1996," NREL/SR-520-23432, UC Category 1280, 1997, 31 pages.

Schmidt et al., "Control of an Optimized Converter for Modular Solar Power Generation," 20th International Conference on Industrial Electronics, Control and Instrumentation, vol. 1, pp. 479-484, 1994.

Schutten et al., "Characteristics of Load Resonant Converters Operated in a High-Power Factor Mode," IEEE, Trans. Power Electronics, vol. 7, No. 2, pp. 5-16, 1991.

Sen et al., "A New DC-TO-AC Inverter With Dynamic Robust Performance," 1998 IEEE Region 10 International Conference on Global Connectivity in Energy, Computer, Communication and Control, vol. 2, pp. 387-390, 1998.

Shimizu et al., "Flyback-Type Single-Phase Utility Interactive Inverter with Power Pulsation Decoupling on the DC Input for an AC Photovoltaic Module System," IEEE, Trans. Power Electronics, vol. 21, No. 5, pp. 1264-1272, Sep. 2006.

Singh et al., "Comparison of PI, VSC and Energy Balance Controller for Single Phase Active Filter Control," 1998 IEEE Region 10 International Conference on Global Connectivity in Energy, Computer, Communication and Control, vol. 2, pp. 607-614, 1998.

Strong et al., "Development of Standardized, Low-Cost AC PV Systems—Phase I Annual Report," NREL/SR-520-23002, Jun. 1997, 18 pages.

Strong et al., "Development of Standardized, Low-Cost AC PV Systems—Final Technical Report," NREL/SR-520-26084, Feb. 1999, 27 pages.

Sung et al., "Novel Concept of a PV Power Generation System Adding the Function of Shunt Active Filter," 2002 Transmission and Distribution Conference and Exhibition: Asia Pacific, vol. 3, pp. 1658-1663, 2002.

Takahashi et al., "Development of Long Life Three Phase Uninterruptible Power Supply Using Flywheel Energy Storage Unit," Proc. Int'l. Conf. Power Electronics, vol. 1, pp. 559-564, 1996.

Takahashi et al., "Electrolytic Capacitor-Less PWM Inverter", in Proceedings of the IPEC '90, Tokyo, Japan, pp. 131-138, Apr. 2-6, 1990.

Thomas et al., "Design and Performance of Active Power Filters," IEEE IAS Magazine, 9 pages, 1998.

Tian, "Solar-Based Single-Stage High-Efficiency Grid-Connected Inverter," Masters Thesis, University of Central Florida, Orlando, 83 pages, 2005.

Vezzini et al., "Potential for Optimisation of DC-DC Converters for Renewable Energy by use of High Bandgap Diodes," 35th Annual IEEE Power Electronics Specialists Conference, vol. 5, 3836-3842, 2004.

(56) References Cited

OTHER PUBLICATIONS

Wada et al., "Reduction Methods of Conducted EMI Noise on Parallel Operation for AC Module Inverters," 2007 IEEE Power Electronics Specialists Conference, pp. 3016-3021, Jun. 2007.

Wu et al., "A Single-Phase Inverter System for PV Power Injection and Active Power Filtering With Nonlinear Inductor Consideration," IEEE Transactions on Industry Applications, vol. 41, No. 4, pp. 1075-1083, 2005.

Wu, et al., "A 1Φ 3W Grid-Connection PV Power Inverter with APF Based on Nonlinear Programming and FZPD Algorithm," Eighteenth Annual IEEE Applied Power Electronics Conference and Exposition, APEC '03, vol. 1, pp. 546-5552, 2003.

Wu, et al., "A 1Φ 3W Grid-Connection PV Power Inverter with Partial Active Power Filter," IEEE Transactions on Aerospace and Electronic Systems, vol. 39, No. 2, pp. 635-646, Apr. 2003.

Wu, et al., "PV Power Injection and Active Power Filtering With Amplitude-Clamping and Amplitude-Scaling Algorithms," IEEE Trans. on Industry Applications, vol. 43, No. 3, pp. 731-741, 2007.

Xue et al., "Topologies of Single-Phase Inverters for Small Distributed Power Generators: An Overview," IEEE Transactions on Power Electronics, vol. 19, No. 5, pp. 1305-1314, 2004.

Ando et al., "Development of Single Phase UPS Having AC Chopper and Active Filter Ability," IEEE International Conference on Industrial Technology, 10.1109/ICIT.2006.372445, pp. 1498-1503, 2006.

Biel et al., "Sliding-Mode Control Design of a Boost-Buck Switching Converter for AC Signal Generation," vol. 51, issue 8, pp. 1539-1551, 2004.

Biel et al., "Sliding-Mode Control of a Single-Phase AC/DC/AC Converter," Proceedings of the 40th IEEE Conference on Decision and Control, vol. 1., pp. 903-907, Dec. 2001.

Bose et al., "Electrolytic Capacitor Elimination in Power Electronic System by High Frequency Filter," Conference Record of the 1991 IEEE Industry Applications Society Annual Meeting, vol. 1, pp. 869-878, 1991.

Bower et al., "Innovative PV Micro-inverter Topology Eliminates Electrolytic Capacitors for Longer Lifetime," Conference Record of the 2006 IEEE 4th World Conference on Photovoltaic Energy Conversion, vol. 2, pp. 2038-2041, May 2006.

Bower, "The AC PV Building Block-Ultimate Plug-n-Play That Brings Photovoltaics Directly to the Customer," Proceedings of the National Center for Photovoltaics (NCPV) and Solar Program Review Meeting, pp. 311-314, May 2003.

Brekken et al., "Utility-Connected Power Converter for Maximizing Power Transfer From a Photovoltaic Source While Drawing Ripple-Free Current," 2002 IEEE 33rd Annual Power Electronics Specialists Conference, vol. 3, pp. 1518-1522, 2002.

Brekken, "Utility-Connected Power Converter for Maximizing Power Transfer From a Photovoltaic Source," Thesis Submitted to the Faculty of the Graduate School of the University of Minnesota, Jun. 2002, 56 pages.

Bush, "UK Solar Firm Discloses Novel Inverter Topology," ElectronicsWeekly.com. Apr. 2011, last accessed Aug. 30, 2011 at http://www.electronicsweekly.com/Articles/2011/04/26/50953/UK-solar-firm-discloses-novel-inverter-topology.htm.

Chang et al., "The Impact of Switching Strategies on Power Quality for Integral Cycle Controllers," IEEE Transactions on Power Delivery, vol. 18, No. 3, pp. 1073-1078, Jul. 2003.

Chisenga, "Development of a Low Power Photovoltaic Inverter for Connection to the Utility Grid," PhD Thesis, Fitzwilliam College, Cambridge, 173 pages, 2007.

Di Napoli et al., "Multiple-Input DC-DC Power Converter for Power-Flow Management in Hybrid Vehicles," Conference Rec. IEEE Industrial Applications Soc. Annual Meeting, pp. 1578-1585, 2002.

Edelmoser, "Improved 2kw Solar Inverter With Wide Input Voltage Range," IEEE 10th Mediterranean Conference, MEleCon 2000, vol. 2, pp. 810-813, 2000.

Enphase Energy, "Application Note: Multi-Tenant Design Guidelines," rev. 1, 5 pages, 2008.

Enphase Energy, "Enphase Field Wiring Diagram—M190 & M210 Microinverters—240v, Single Phase," Drawing No. 144-00001, rev. 6, 1 page, 2009.

Enphase Energy, "Enphase Micro-Inverter Technical Data," Doc. No. 142-00004, rev. 2, 2 pages, 2008.

Esram et al., "Comparison of Photovoltaic Array Maximum Power Point Tracking Techniques," IEEE Transactions on Energy Conversion, vol. 22, No. 2, pp. 439-449, Jun. 2007.

Henze et al., "A Novel AC Module with High-Voltage Panels in CIS Technology," 23rd European Photovoltaic Solar Energy Conference, Valencia, Spain, ISBN 3-936338-24-8, 8 pages, Sep. 2008.

Hu et al., "Efficiency Improvement of Grid-tied Inverters at Low Input Power Using Pulse Skipping Control Strategy," Twenty-Fifth Annual IEEE Applied Power Electronics Conference and Exposition, pp. 627-633, Feb. 2010.

Hung et al., "Analysis and Implementation of a Delay-compensated Deadbeat Current Controller for Solar Inverters," IEEE Proceedings—Circuits, Devices and Systems, pp. 279-286, 2001.

Itoh et al., "Ripple Current Reduction of a Fuel Cell for a Single-Phase Isolated Converter using a DC Active Filter with a Center Tap," Twenty-Fourth Annual IEEE Applied Power Electronics Conference and Exposition, APEC '09, pp. 1813-1818, 2009.

Jantsch et al., "AC PV Module Inverters With Full Sine Wave Burst Operation Mode for Improved Efficiency of Grid Connected Systems at Low Irradiance," Proceedings of the 14th European Photovoltaic Solar Energy Conference, 5 pages, 1997.

Jeong et al., "An Improved Method for Anti-Islanding by Reactive Power Control," pp. 965-970, 2005.

Jung et al., "A Feedback Linearizing Control Scheme for a PWM Converter-Inverter Having a Very Small DC-Link Capacitor," IEEE Transactions on Industry Applications, vol. 35., issue 5, pp. 1124-1131, 1999.

Jung et al., "High-frequency DC Link Inverter for Grid-Connected Photovoltaic System," Conference Record of the Twenty-Ninth IEEE Photovoltaic Specialists Conference, pp. 1410-1413, 2002.

Kern, "SunSine300: Manufacture of an AC Photovoltaic Module, Final Report, Phases I & II, Jul. 25, 1995-Jun. 30, 1998," NREL/SR-520-26085, 1999, 32 pages.

Khajehoddin et al., "A Nonlinear Approach to Control Instantaneous Power for Single-phased Grid-connected Photovoltaic Systems," IEEE Energy Conversion Congress and Exposition (ECCE), pp. 2206-2212, 2009.

Khajehoddin et al., "A Novel Topology and Control Strategy for Maximum Power Point Trackers and Multi-string Grid-connected PV Inverters," Applied Power Electronics Conference, APEC08, pp. 173-178, 2008.

Khajehoddin et al., "A Robust Power Decoupler and Maximum Power Point Tracker Topology for a Grid-Connected Photovoltaic System," IEEE Power Electronics Specialists Conference, PESC08, pp. 66-69, 2008.

Kim et al., "New Control Scheme for AC-DC-AC Converter Without DC Link Electrolytic Capacitor," 24th Annual IEEE Power Electronics Specialists Conference, PESC '93 Record., pp. 300-306, 1993.

Kitano et al., "Power Sensor-less MPPT Control Scheme Utilizing Power Balance at DC Link—System Design to Ensure Stability and Response," The 27th Annual Conference of the IEEE Industrial Electronics Society, vol. 2, pp. 1309-1314, 2001.

Kjaer et al., "A Novel Single-Stage Inverter for the AC-module with Reduced Low-Frequency Ripple Penetration," EPE 2003, ISBN 90-75815-07-7, 10 pages, 2003.

Kjaer et al., "A Review of Single-phase Grid-connected Inverters for Photovoltaic Modules," IEEE Trans on Power Electronics, vol. 41, No. 5, pp. 1292-1306, 2005.

Kjaer et al., "Design Optimization of a Single Phase Inverter for Photovoltaic Applications," IEEE 34th Annual Power Electronics Specialist Conference, PESC '03, vol. 3, pp. 1183-1190, 2003.

Kjaer et al., "Power Inverter Topologies for Photovoltaic Modules—A Review," Conf. record of the 37th Industry Applications Conference, vol. 2, pp. 782-788, 2002.

Kjaer, "Design and Control of an Inverter for Photovoltaic Applications," PhD Thesis, Aalborg University Institute of Energy Technology, 236 pages, 2005.

(56) References Cited

OTHER PUBLICATIONS

Kjaer, "Selection of Topologies for the PHOTOENERGY™ Project," Aalborg University Institute of Energy Technology, 37 pages, 2002.

Kotsopoulos et al., "A Predictive Control Scheme for DC Voltage and AC Current in Grid-Connected Photovoltaic Inverters with Minimum DC Link Capacitance," The 27th Annual Conference of the IEEE Industrial Electronics Society, vol. 3, pp. 1994-1999, 2001.

Kotsopoulos et al., "Predictive DC Voltage Control of Single-Phase PV Inverters with Small DC Link Capacitance," 2003 IEEE International Symposium on Industrial Electronics, vol. 2, pp. 793-797, 2003.

Johnson, Brian et al., "Photovoltaic AC Module Composed of a Very Large Number of Interleaved Inverters," 2011, 6 pages.

* cited by examiner

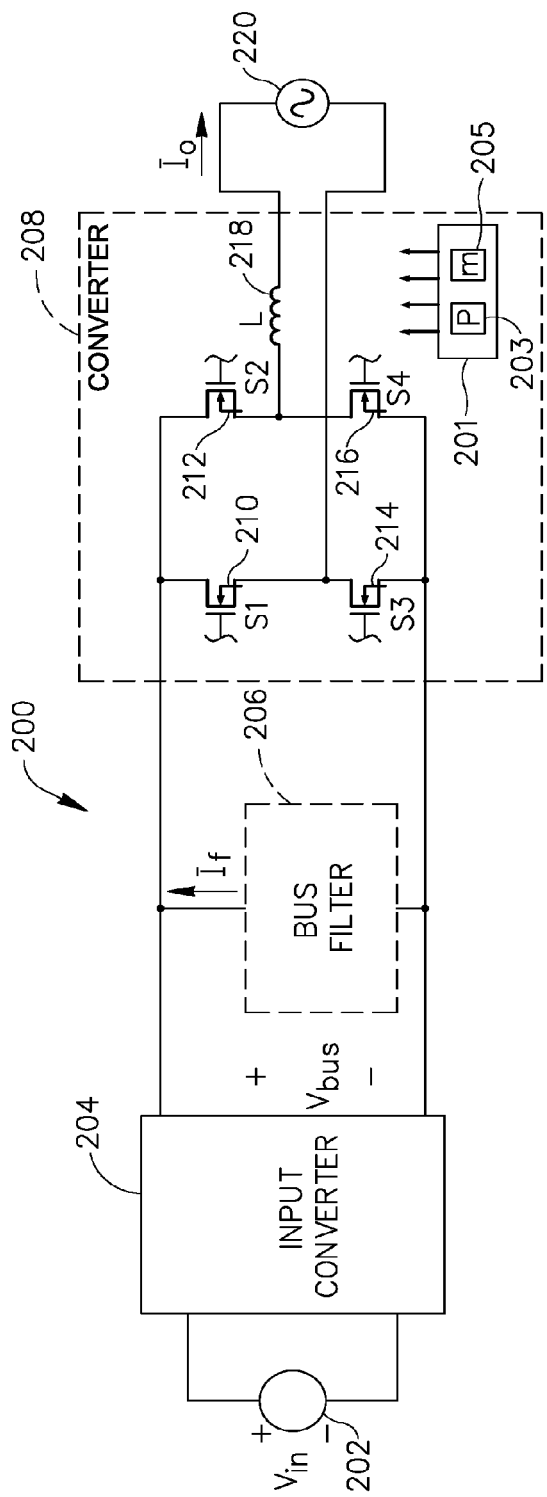
FIG. 2
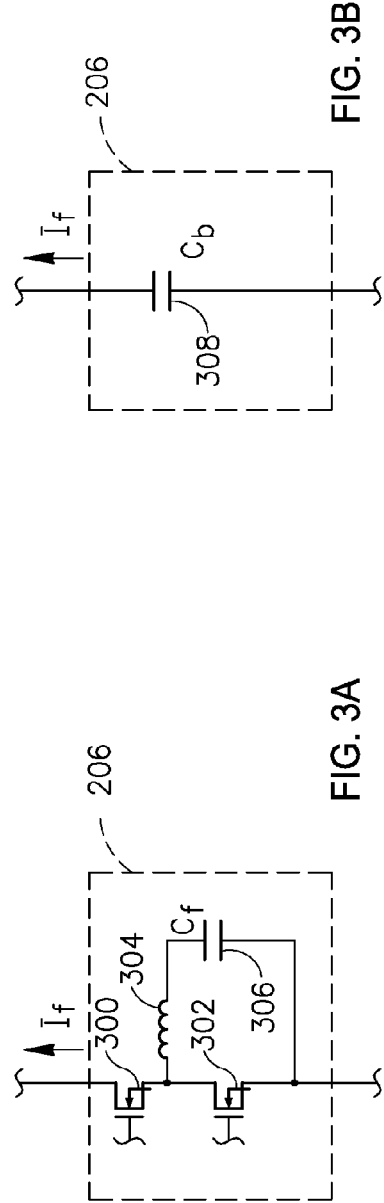
FIG. 3A
FIG. 3B

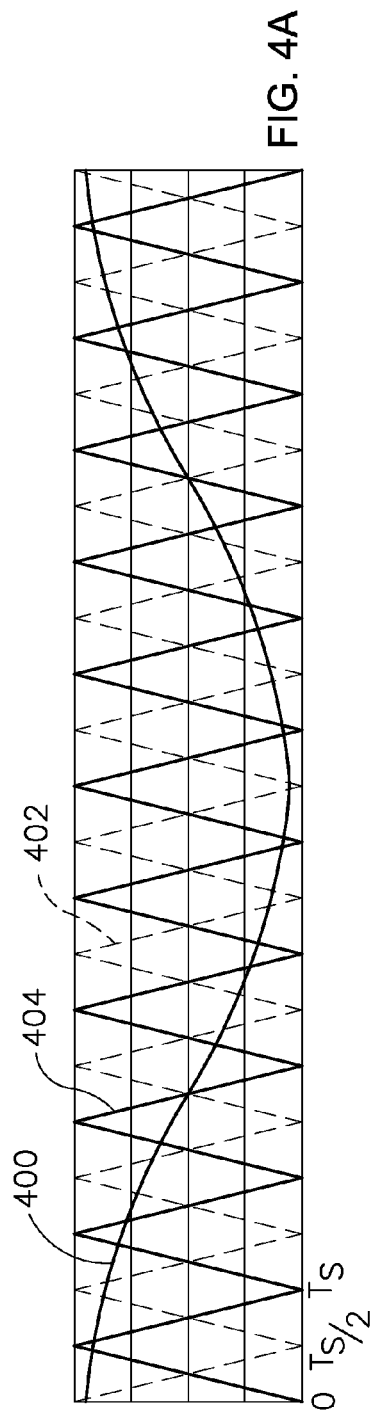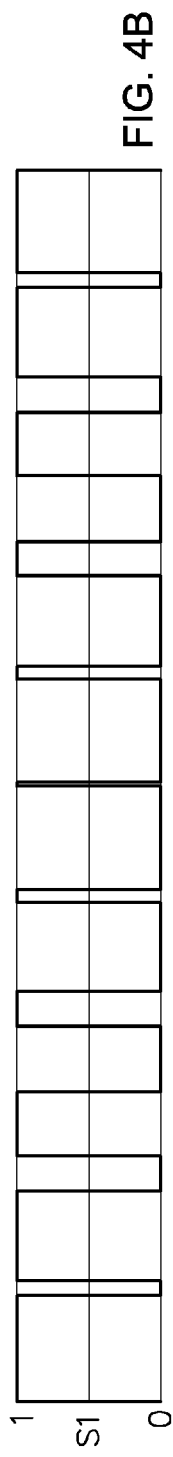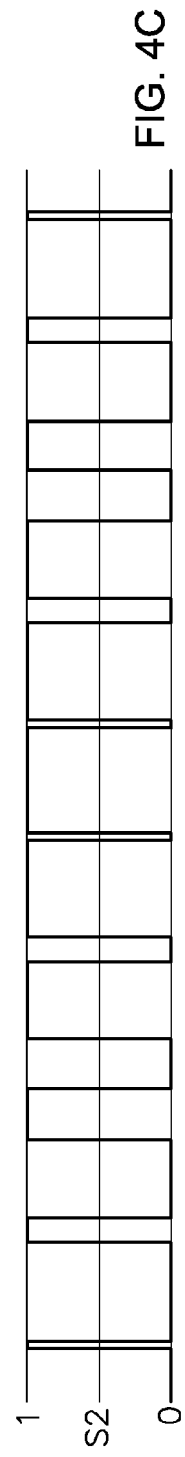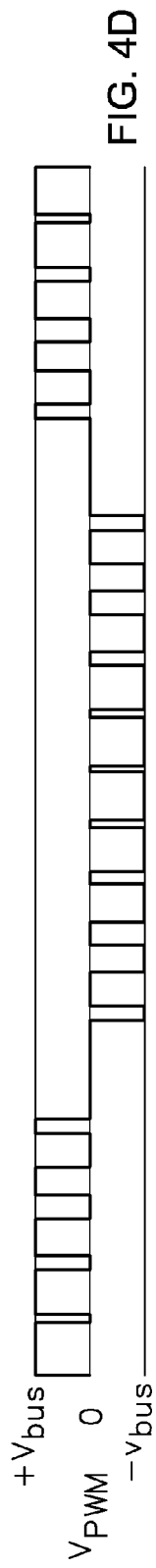

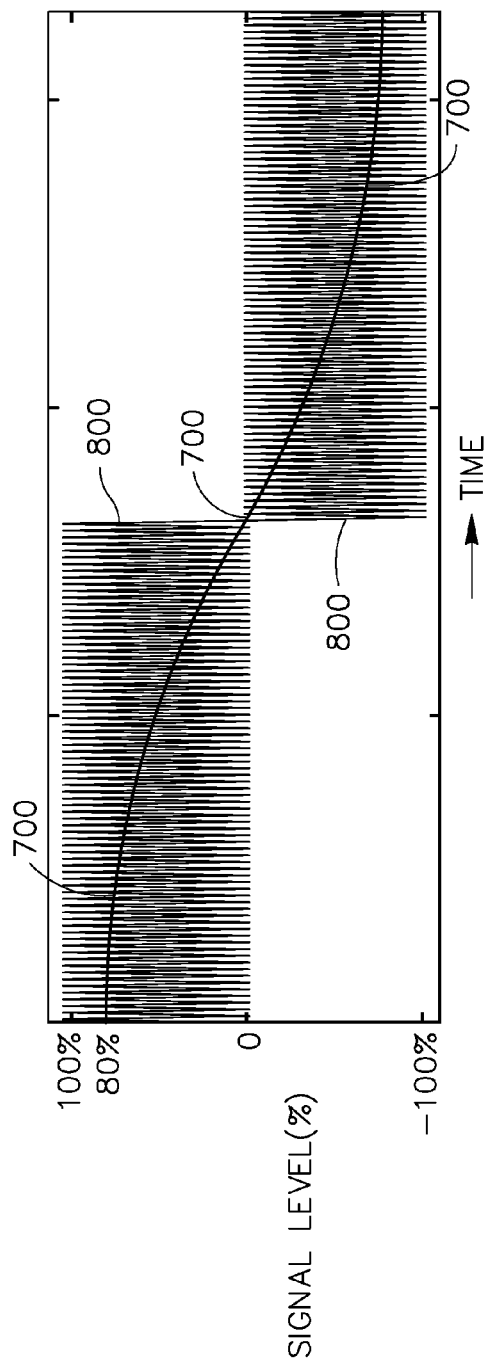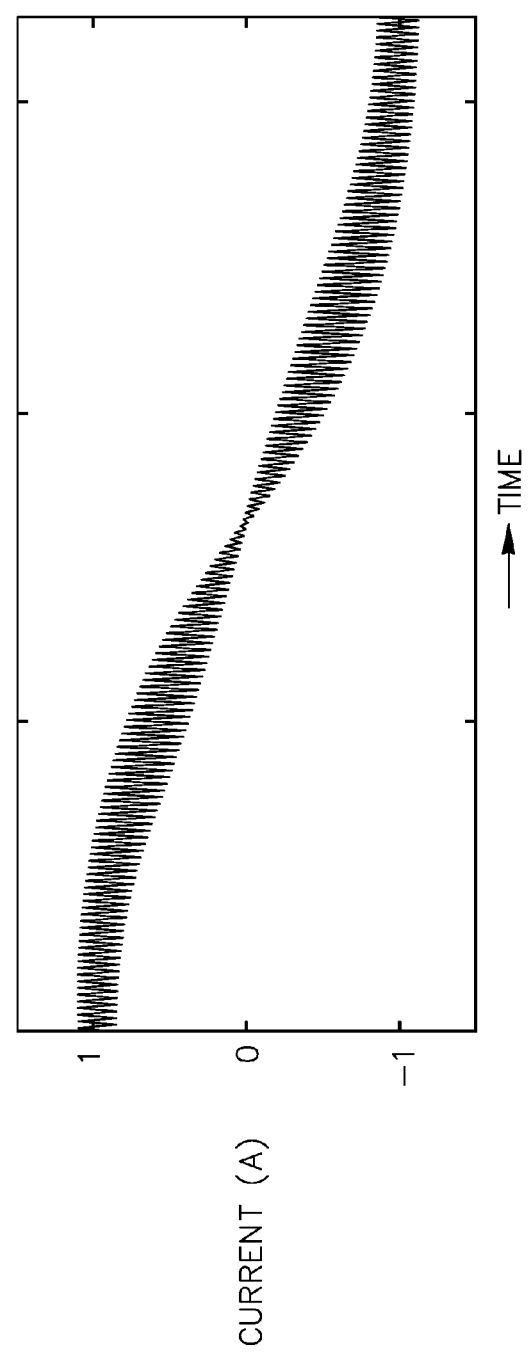

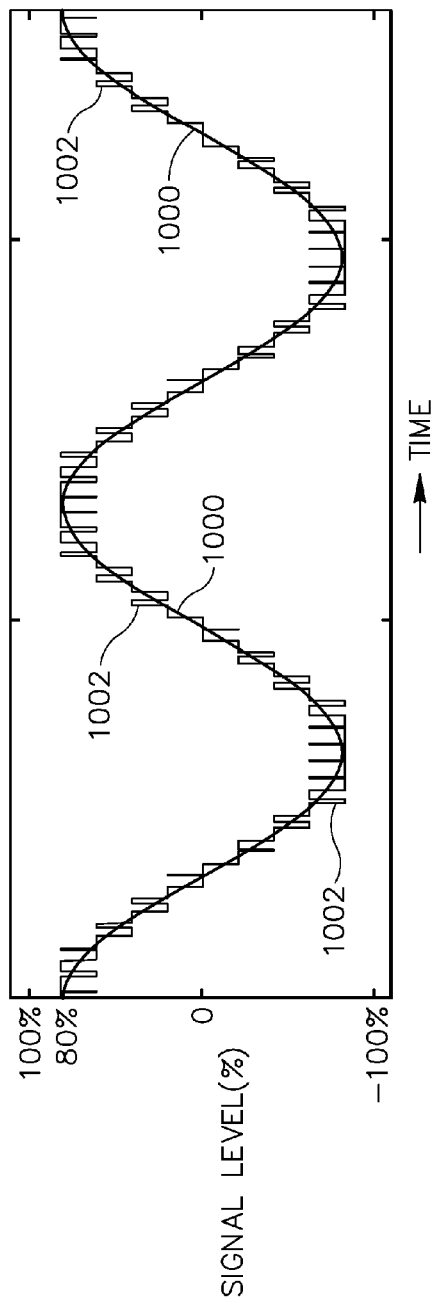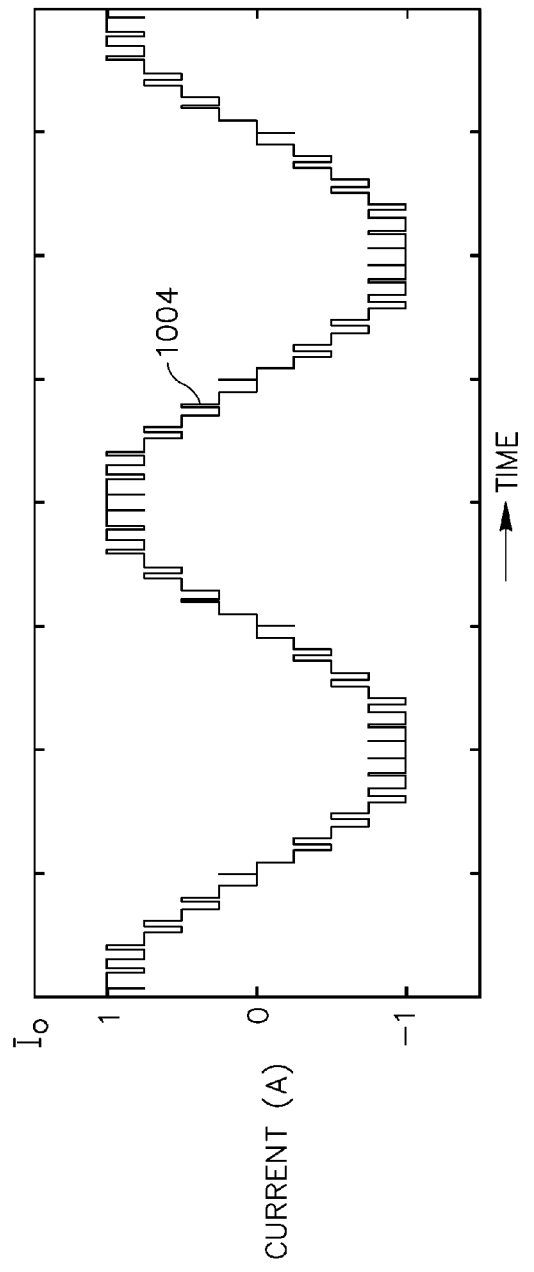

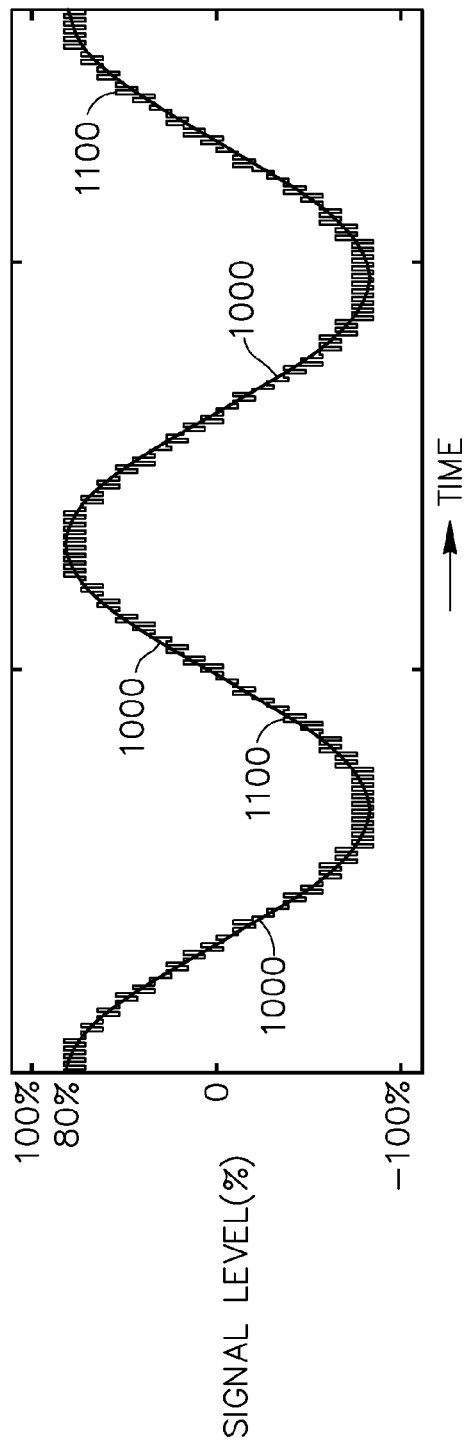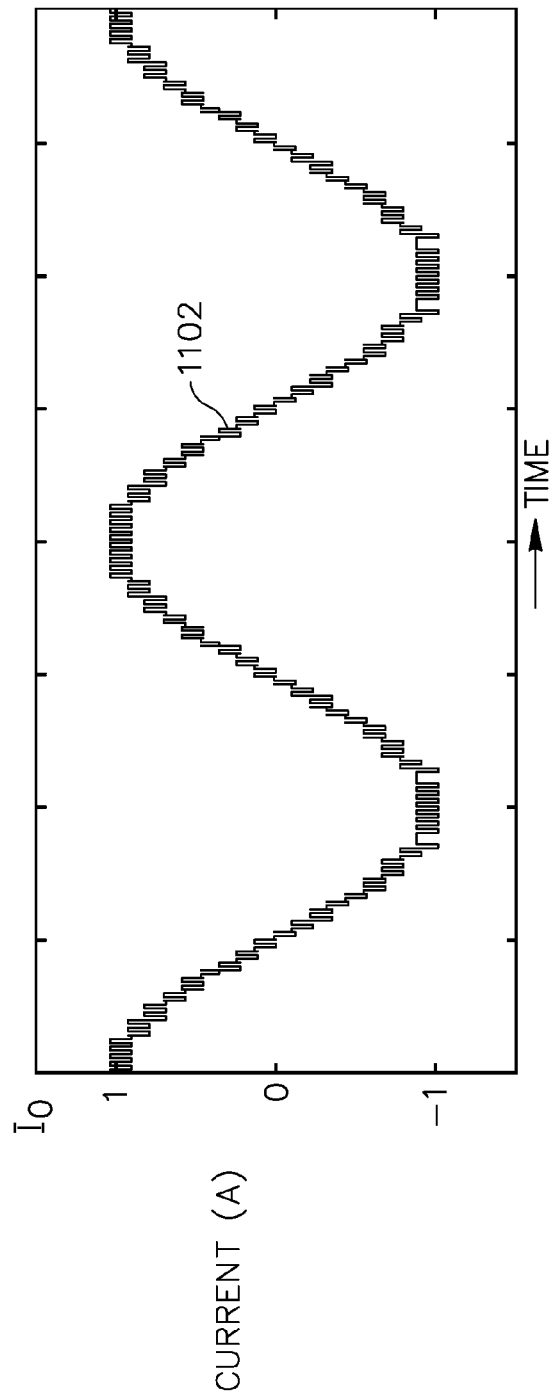

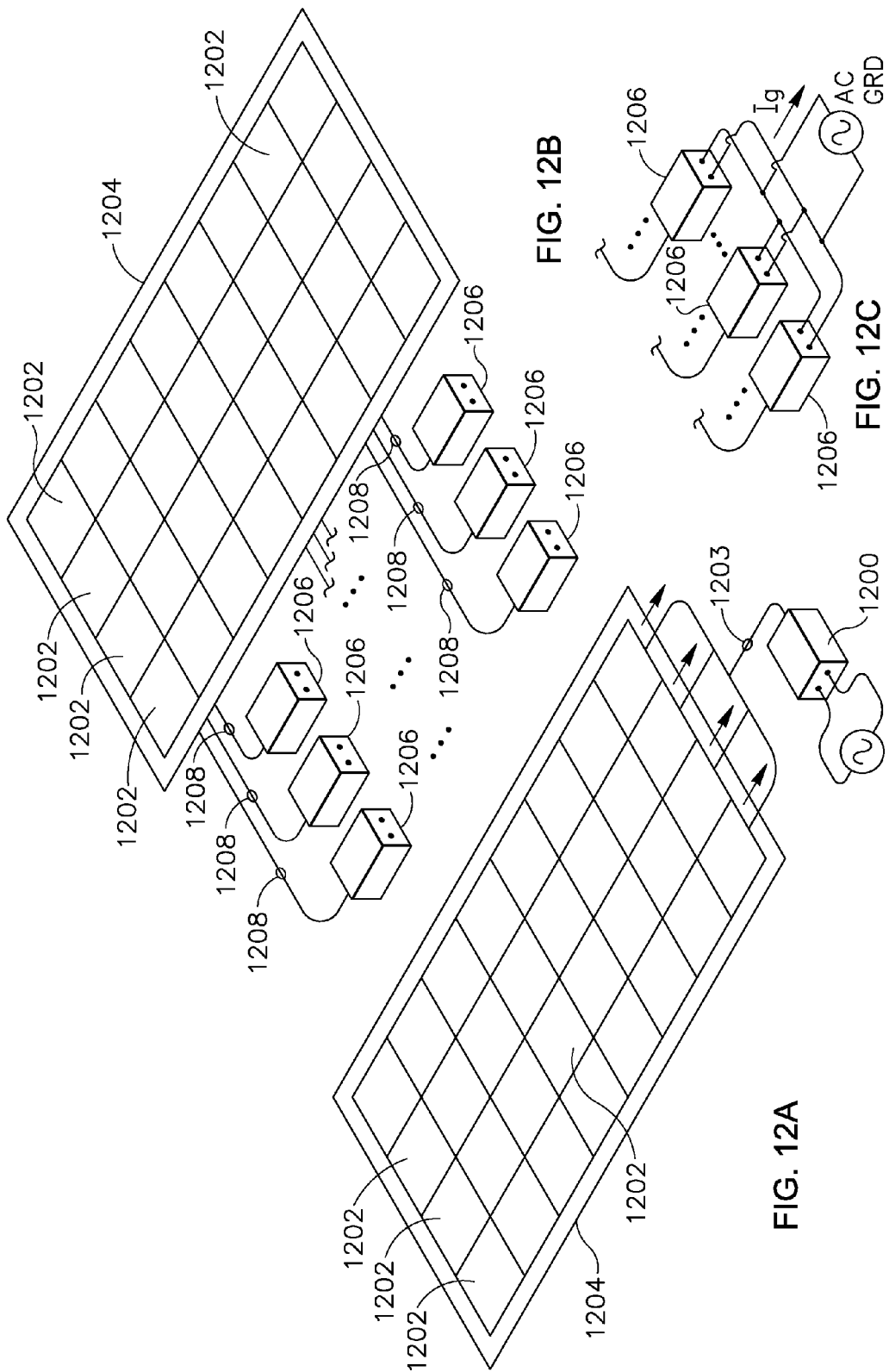

US 9,467,063 B2

TECHNOLOGIES FOR INTERLEAVED CONTROL OF AN INVERTER ARRAY

TECHNICAL FIELD

The present disclosure relates, generally, to power converters that convert direct current ("DC") power to alternative current ("AC") power.

BACKGROUND

As used herein, the term inverter refers to a power converter that converts a direct current ("DC") into an alternating current ("AC"). One application of an inverter is conversion of power from a DC source, such as, e.g., a battery, a photovoltaic cell or a fuel cell, for delivery to an AC utility grid. Certain inverters (e.g., those used by residential customers or small businesses) convert the DC power delivered by the DC source into single-phase AC power and deliver a sinusoidal current to the AC grid at the utility grid frequency. Inverters typically comprise switches that operate at a switching frequency that is high relative to the grid frequency. In an ideal inverter, the inverter output will be a pure single-frequency sinusoid at the utility grid frequency; in practice the inverter output will comprise switching artifacts, such as waveform ripple (e.g., deviation of the output current waveform from an ideal sinusoidal waveform), and will comprise noise components and frequency components at harmonics of the switching frequency. It is desirable that an inverter operate at high conversion efficiency while minimizing switching artifacts. Grid-connected inverters may, e.g., be required to meet the requirements of FCC Part 15, Classes A and B.

One way to reduce switching artifacts may be to use a passive filter at the output of an inverter. The size of the filter components selected may depend on the switching frequency: higher switching frequencies may result in both smaller filter components and less waveform ripple. However, higher switching frequencies may also result in lower conversion efficiency. Another way to reduce switching artifacts is to use a "multi-level inverter" in which series combinations of switches operate from multiple voltage sources to yield many possible switched output voltage levels. Both voltage-fed and current-fed multi-level converters are known.

In some energy systems, an inverter delivers power from one or more photovoltaic ("PV") cells to an AC utility grid. Deriving power from PV cells and delivering it the AC grid presents a number of challenges, including operating cells at their maximum power points ("MPP"); achieving a high "utilization ratio" (i.e., the fraction of the total available power that is actually extracted); and minimizing ripple reflected back into the PV cells by the inverter. For practical reasons, PV cells are typically configured into PV panels that include series-parallel combinations of cells. A photovoltaic panel may, for example, includes 72 individual photovoltaic cells arranged to provide, e.g., 36V at 240 Watts. Panels and inverters may be further combined in series-parallel arrangements to scale up the total delivered voltage and power.

Panels and arrays of panels present additional challenges. For example, shading of even a few cells on a panel may result in substantial degradation of the total power delivered by the panel. In one topology, a "string-based" PV inverter system may comprise a single inverter that receives power from an array of several PV panels; in another "distributed" topology, several inverters may be provided, each inverter being configured to receive power from one panel. A properly designed distributed topology may exhibit improved utilization ratio and better overall MPP tracking than a string-based system.

SUMMARY

According to one aspect of the disclosure, an apparatus to deliver an alternating current (AC) power may include a controller having a processor and a memory. The apparatus may also include a plurality of power inverters in communication with the controller. Each power inverter may be configured to convert direct-current (DC) power into the (AC) power. Each of the plurality of power inverters may be configured to be controlled by the controller to generate AC power below at least one predetermined operating threshold. The plurality of power inverters may be configured to combine AC power generated by each of the plurality of power inverters, such that the combined AC power is delivered to a common AC load above the predetermined operating threshold.

According to another aspect of the disclosure, the apparatus may be arranged and operated according to a ratio of $FMA=F_r/N$, where $Fr=f_s$ is the switching frequency of the plurality of power inverters, $f_l$ is the frequency of the common AC load, and N is the number of power inverters of the apparatus.

According to another aspect of the disclosure, a power inverter may receive power from a direct current (DC) input source and deliver alternating current (AC), at a first frequency, $f_l$. The power inverter may include a controller having a processor and memory. The power inverter may also include an active filter in communication with the controller and configured to supply AC power at twice the first frequency. The active filter may include at least two switching converters. Each switching converter may include a set of switches and deliver an AC current. Each set of switches may operate in a series of switching cycles during which the relative timing and duration of the on and off times of each switch within the set of switches is configured to be controlled by the controller to control AC power delivered by each switching converter. The duration of each switching cycle may define a switching period and a switching frequency, fs, for a switching converter, and wherein the controller is configured to control the switching cycles of the plurality of switching converters to be interleaved with respect to one another.

DESCRIPTION OF THE DRAWINGS

FIG. 2 is an example schematic of an inverter.

FIGS. 3A and 3B show example filter configurations for use in the inverter of FIG. 2.

FIGS. 4A-4D shows example waveforms illustrating a tri-level modulation scheme.

FIGS. 8A and 8B show example waveforms for the inverter of FIG. 6 operating at a switching frequency of 10 kHz.

FIGS. 10A and 10B show example waveforms for an array of five interleaved inverters according to the present disclosure.

FIGS. 11A and 11B show example waveforms for an array of eleven interleaved inverters according to the present disclosure.

FIG. 12A shows an example photovoltaic (PV) panel delivering power to a single inverter.

FIG. 12B shows example PV cells in a PV panel delivering power to a plurality of inverters.

FIG. 12C shows example details of the output connection of the inverters shown in FIG. 12B.

DETAILED DESCRIPTION

In the disclosure that follows, use of the same symbols for both actual and measured signals is for ease of discussion. The measured signals may be acquired, measured, converted between the analog and digital domains and vice versa, scaled, level-shifted, filtered, or isolated by known means as needed and it may also be assumed that power or other composite signals may be calculated from voltage and current signals.

Figure 1:
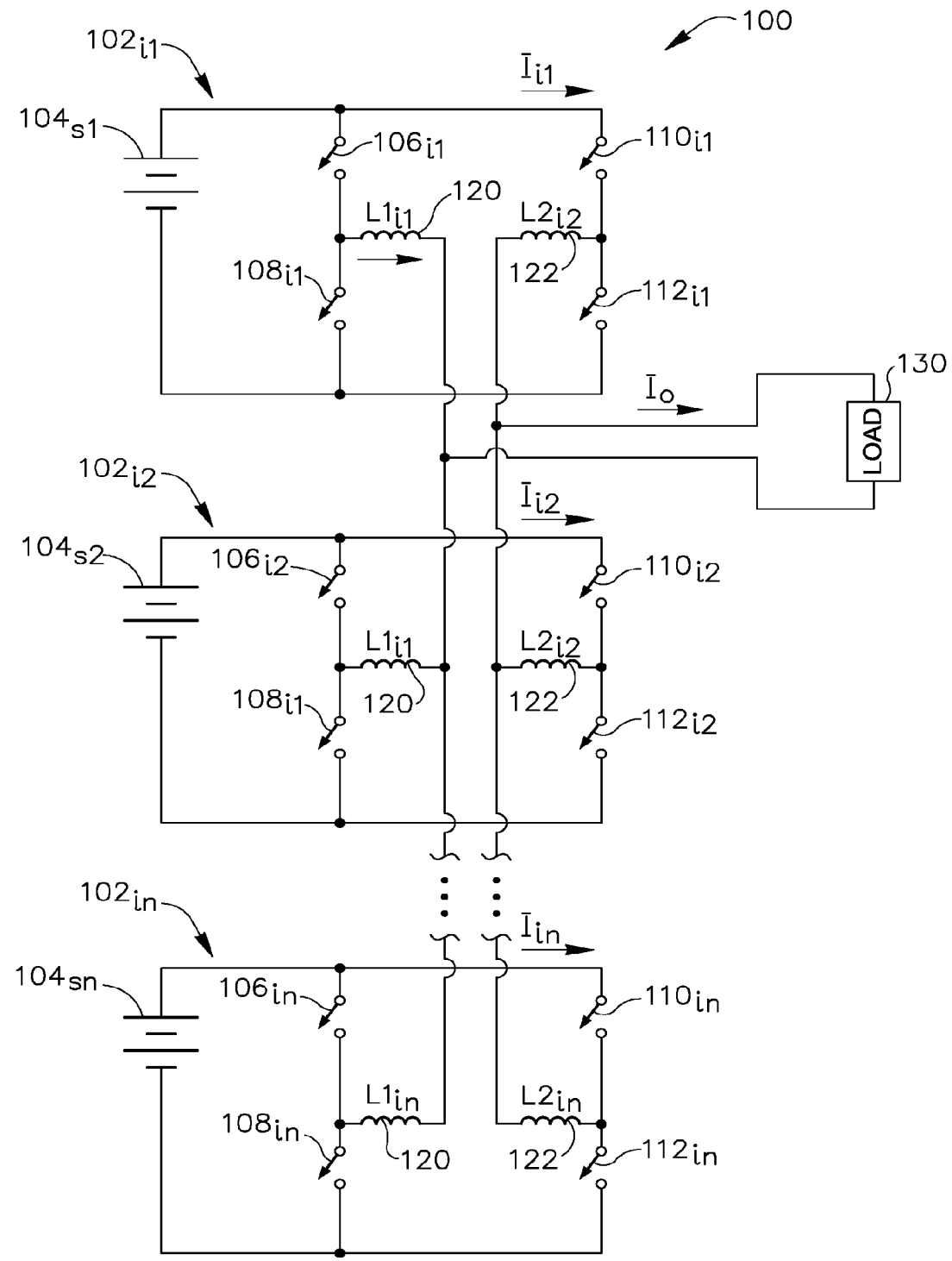
FIG. 1 is an example system topology of an array of inverters.

An example of an idealized system topology for a distributed DC-AC inverter array 100 is shown in FIG. 1. The inverter array 100 may include a plurality of inverters 102 individually designated as $102_{i1}$ through $102_{in}$, where n is the number of inverters in the inverter array 100. Each inverter 102 receives power from one or more unipolar ("DC") input power sources 104, individually designated as $104_{s1}$-$104_{sm}$, where m is the number of input power sources. The input power sources $104_{s1}$-$104_{sm}$ may represent a single power source that delivers power to all of the inverters 102 or the input sources $104_{s1}$-$104_{sm}$ may represent several sources, each of which individually delivers power to one or more of the inverters 102. Each input source 104 may be a battery, PV cell, fuel cell or other source may capable of supplying a unipolar voltage. Each inverter $102_{i1}$ through $102_{in}$ may include a respective set of switches $106_{(i1-in)}$ through $112_{(i1-in)}$ shown in FIG. 1 arranged in a bridge configuration and a respective filter (e.g. filter inductances $120_{i1}$ through $120_{in}$ and $122_{i1}$, through $122_{in}$ in inverters $102_{i1}$ through $102_{in}$, respectively). Switches may be metal-oxide semiconductor field effect transistors (MOSFTs), insulated gate bipolar transistors (IGBTs), or any other suitable power switching device.

In operation, the switches 106-112 in each inverter 102 may be operated by a controller (not shown) through a series of switching cycles, the duration of the switching cycle defining a switching period, $T_s$, and a switching frequency, $f_s$=1/$T_s$, during which the relative timing and duration of the ON and OFF times of each of the switches 106-112 is controlled so that each inverter 102 converts its respective unipolar input voltage into a respective bipolar (i.e., AC) output current, $I_{i1}$ through $I_{in}$, each having a fundamental frequency equal to desired AC load frequency, $f_l$. Each inverter 102 may include a respective first filter inductance 120 ($L1_{i1}$-$L1_{in}$) and a second filter inductance 122 ($L2_{i1}$-$L2_{in}$) and may be configured to smooth the flow of current delivered by each respective inverter 102. In one example, the switching frequency $f_s$ is greater (e.g., 3 or more times greater) than the load frequency $f_l$. As shown in FIG. 1, the outputs of all of the inverters 102 are connected together and to a common load 130 and the total array AC output current, $I_o$, delivered to the load is the sum of the individual inverter output currents: $I_o$=$I_{i1}$+$I_{i2}$+ . . . +$I_{in}$. In one example, the load 130 may be an AC utility grid (e.g., a 220 VAC, 60 Hz utility grid). In some applications, the current delivered by each inverter 102, and hence the power delivered by each inverter 102, may be controlled to be substantially equal.

In a single-phase AC power system that may implement inverters such as the inverters 102, a basic electrical property is that energy flow includes both an average power portion that delivers useful energy from an energy source to a load and a double-frequency portion that flows back and forth between the load and the energy source:

$$p(t)=Po+Po*\cos(2*\omega_l*t+\phi) \qquad \text{Eqn. (1),}$$

where $\omega_l$ is the AC power system angular frequency in radians per second, t is time, and $\phi$ is the phase angle. The AC power system frequency may then be defined as $f_l$=$\omega_l$/(2*$\pi$). In applications involving inverters, the double-frequency portion, at the frequency 2*$f_l$, may represent undesirable ripple power that, if reflected back into the DC power source, may compromise performance of the source, such as in photovoltaic cells.

FIG. 2 is a circuit schematic of an example inverter 200 that may be used to illustrate an example switching strategy configured to reduce undesired effects such as undesirable ripple power. The inverter 200 may include a controller 201. The controller 201 may include processor 203 and a memory device 205. The memory device 205 may include one or more memories and may be non-transitory computer-readable storage media or memories, such as a cache, buffer, RAM, removable media, hard drive or other computer readable storage media. Computer readable storage media may include various types of volatile and nonvolatile storage media. Various processing techniques may be implemented by the processor 203 such as multiprocessing, multitasking, parallel processing and the like, for example. The processor 203 may include one or more processors. Alternatively, the controller 201 may be a circuit, logic, or any other device capable of switching in response to a triangle wave and an input. The inverter 200 may receive power from a unipolar (DC) input source ($V_{in}$) 202 and deliver the power to an AC load 220, such as a utility grid (e.g., a 220 VAC, rms, 60 Hz utility grid). An input converter 204 may receive energy from the input source 202 and generate a unipolar bus voltage, $V_{bus}$, that is greater than the peak voltage of the AC voltage, $V_{ac}$. A current-sourcing output converter 208 may include output switches 210, 212, 214, and 216 arranged in a bridge configuration, and an output filter inductance (L) 218. The controller 201 may control the output switches 210 through 216 to deliver an AC current, $I_o$, at the load frequency. The inverter 200 may include a bus filter 206 for supplying double-frequency power (see, e.g., Eqn. 1). In some examples the bus filter 206 may include an active filter, comprising, e.g., switches 300, 302, filter capacitance $C_f$ 306 and smoothing inductance 304, as shown in FIG. 3A; in other examples, the bus filter 206 may be a passive filter that includes a capacitance, $C_b$ 308, as shown in FIG. 3B.

In one example, the output switches 210 through 216 of the inverter 200 may be controlled according to a switching strategy referred to as tri-level pulse width modulation (PWM). Implementation of tri-level PWM is illustrated in FIGS. 4A through 4D. In FIGS. 4A through 4D, a sinusoidal modulation waveform 400 at the AC load frequency, $f_l$, indicative of a desired magnitude for the AC output current, $I_o$, is compared to a first and a second triangular carrier waveform 402 and 404, respectively, each carrier waveform characterized by a carrier frequency (corresponding to the switching frequency of the inverter, $f_s=1/T_s$) that is greater than the load frequency, $f_l$, and each carrier waveform being out of phase with the other by one-half cycle at the switching frequency. As shown in FIGS. 4B and 4C, control logic signals S1 and S2 may be derived by comparing the modulation waveform 400 to the carrier waveforms 402, 404: referring to FIGS. 2 and 4A through 4D, when control signal S1 is high (FIG. 4B), switch 210 is ON and switch 216 is OFF; when control signal S2 (FIG. 4C) is high, switch 212 is ON and switch 214 is OFF. The result, as shown in FIG. 4D, is the tri-level bipolar PWM waveform, $V_{pwm}$ (see FIG. 2). The waveform is filtered by the inverter output filter (e.g., inductance 218, FIG. 2) to produce a smoothed sinusoidal AC current, $I_o$.

Figure 5A:
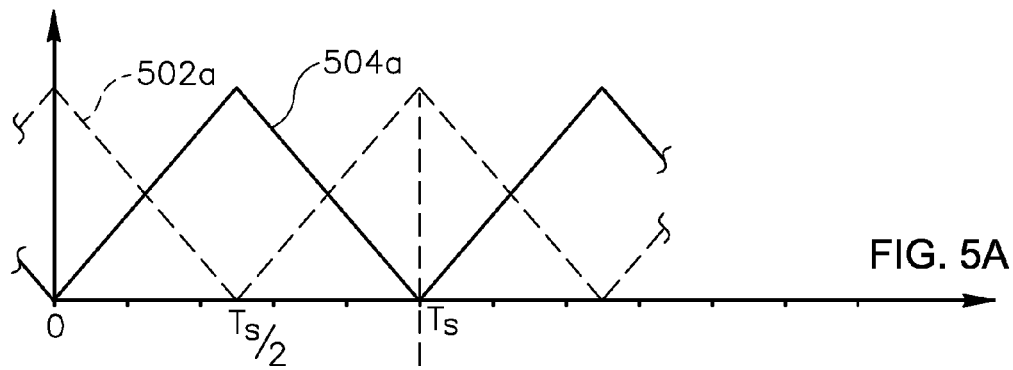
FIGS. 5A-5E show example tri-level modulation carrier waveforms for each inverter in an array of five inverters.
Figure 5B:
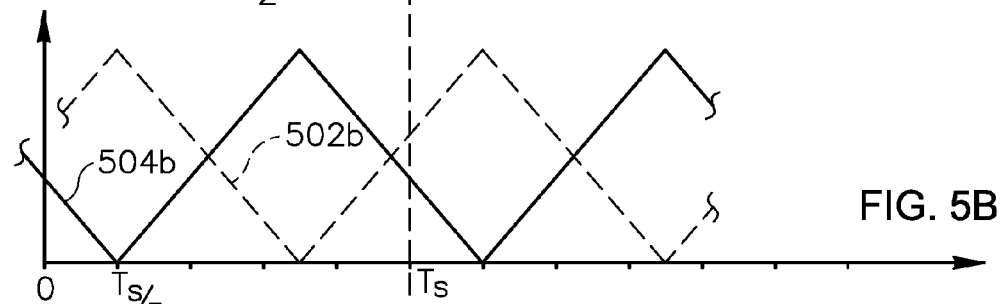
Figure 5C:
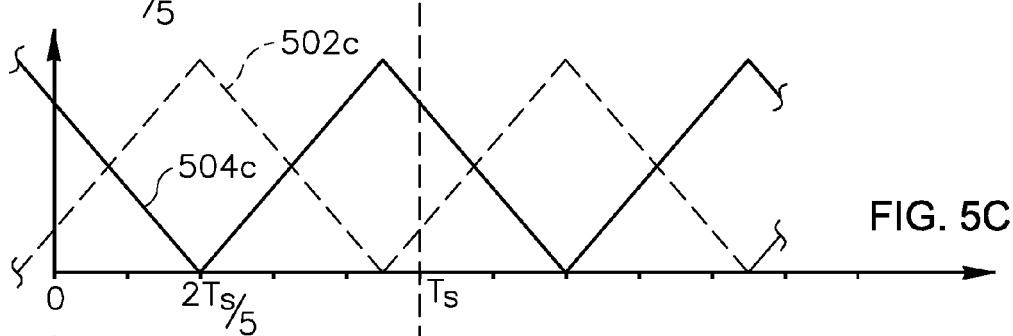
Figure 5D:
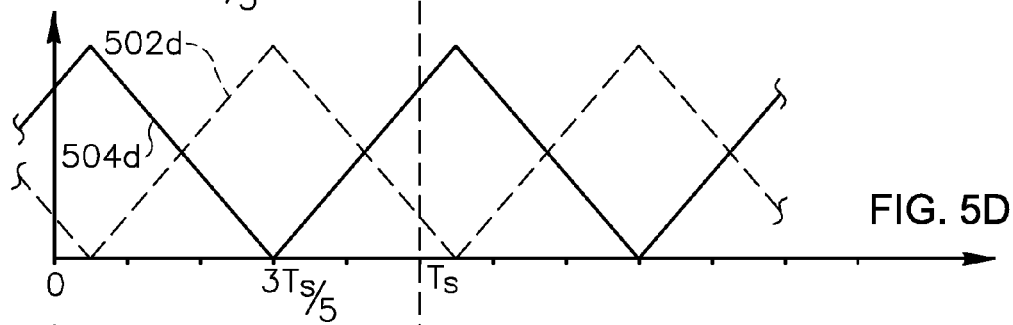
Figure 5E:
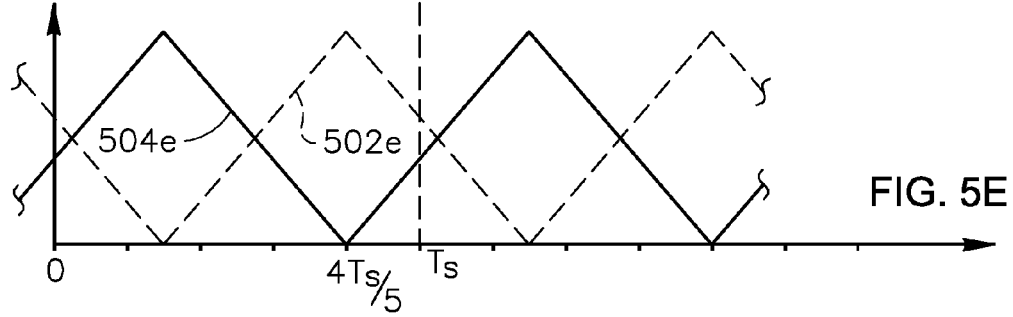

Interleaved operation of both PWM inverters and DC-DC converters may be a technique applied for reducing total power converter output ripple and harmonic content at the inverter/converter switching frequency. In one example, the outputs of a number of inverters or DC-DC converters may be electrically coupled in parallel and the relative switching times of the switches within each converter or inverter are interleaved to occur at staggered intervals throughout the switching period. For example, if five tri-level PWM inverters (i.e. inverters whose switches are controlled to operate in the manner illustrated in FIGS. 4A and 4B) are configured in parallel, the respective switching times may occur at unique multiples of one-fifth of the switching period, as illustrated in FIGS. 5A through 5E. In FIG. 5A, triangular carrier waveforms $502_a$ and $504_b$ for a first inverter in the array are substantially similar to those shown for the single inverter example in FIG. 4A; in FIG. 5B triangular carrier waveforms $502_b$, $504_b$ for a second inverter in the array are shifted in phase by one fifth of the switching period, $T_s/5$; in FIG. 5C triangular carrier waveforms $502_c$, $504_c$ for a third inverter in the array are shifted in phase by two-fifths of the switching period, $2*T_s/5$; in FIG. 5D triangular carrier waveforms $502_d$, $504_d$ for a fourth inverter in the array are shifted in phase by three-fifths of the switching period, $3*T_s/5$; and in FIG. 5E triangular carrier waveforms $502_e$, $504_e$ for a fifth inverter in the array are shifted in phase by four-fifths of the switching period, $4*T_s/5$. Each respective one of the five inverters will generate a respective set of control logic signals corresponding to, but different from, the control logic signals in FIGS. 4B and 4C, by comparing its respective set of triangular carrier waveforms to a single modulation waveform (e.g., modulation waveform 400, FIG. 4A). In this way, each inverter in the array may be operated in a tri-level mode of operation and in an interleaved manner with respect to the other inverters in the array. The example in FIGS. 5A through 5E may be extended to any number of inverters by modifying the delay between carrier waveforms; for a number of N inverters the delay may be adjusted to be $T_s/N$, where $T_s$ is the switching period.

Referring again to FIG. 1, in operation, the inverter array 100 may be operated as an interleaved array such that the switching frequencies of the inverters are synchronized to be substantially equal and the relative switching times of the switches within each converter are interleaved to occur at staggered intervals throughout the switching period (e.g., in an array of n inverters the respective switching times may be configured to occur at unique multiples of 1/n of the switching period). In some applications, conversion efficiency and output signal quality are important operating criteria for inverters and inverter arrays. Conversion efficiency may be improved by reducing losses (e.g., switching losses, filter losses) within the inverter, and output signal quality may be improved by reducing inverter output ripple (i.e., the degree to which the waveform of the AC current delivered by the inverter deviates from a perfect sinusoid at the utility frequency). One way to reduce losses may be to reduce inverter switching frequency. Interleaved operation may be effective in improving the output signal quality of an array by reducing the output ripple of the array relative to the ripple that would otherwise be present in a non-interleaved array.

An inverter for use in a distributed array may be sized to deliver a few hundred watts. Such an inverter, such as the inverters 102 may, for example, be designed to process power from a single PV panel (comprising, e.g., 72 individual PV cells and delivering an aggregate power of 240 Watts at a nominal voltage of 36 VDC). Such inverters may be designed to meet some pre-defined set of output signal quality requirements, such as Federal Communications Commission (FCC) Part 15, Class A or Class B, for example. Meeting these output signal quality requirements may require that the inverter be designed to operate at a switching frequency that is relatively higher, and with a relatively more significant amount of output filtering, than an inverter that is not designed to meet the output signal quality requirements. In such inverters, there is a trade-off between filter losses and switching losses: operation at a lower operating frequency (for lower switching losses) requires larger filter components (resulting in higher filter losses) and vice versa. When such inverters are operated in, for example, an interleaved array, the output signal quality may be substantially better than that which is actually required, whereas the conversion efficiency of the array may not be as high as might otherwise be attainable.

In one example, an interleaved inverter array in which individual inverters, such as the inverters 100, referred to herein as "sub-inverters", may be operated at a relatively low switching frequency and/or with a minimal output filter, thereby increasing the conversion efficiency of the inverter and the array. Despite the fact that individual sub-inverters may be sub-optimal in terms of meeting the desired output signal quality level, interaction between the several sub-inverters in the array may, as further described below, enable the desired level of array output signal quality to be achieved. In this way, the array may exhibit relatively higher conversion efficiency while meeting desired output signal quality requirements. The effectiveness of interleaving in enhancing signal quality may be improved by controlling each of the sub-inverters to deliver substantially the same amount of output power.

Figure 6:
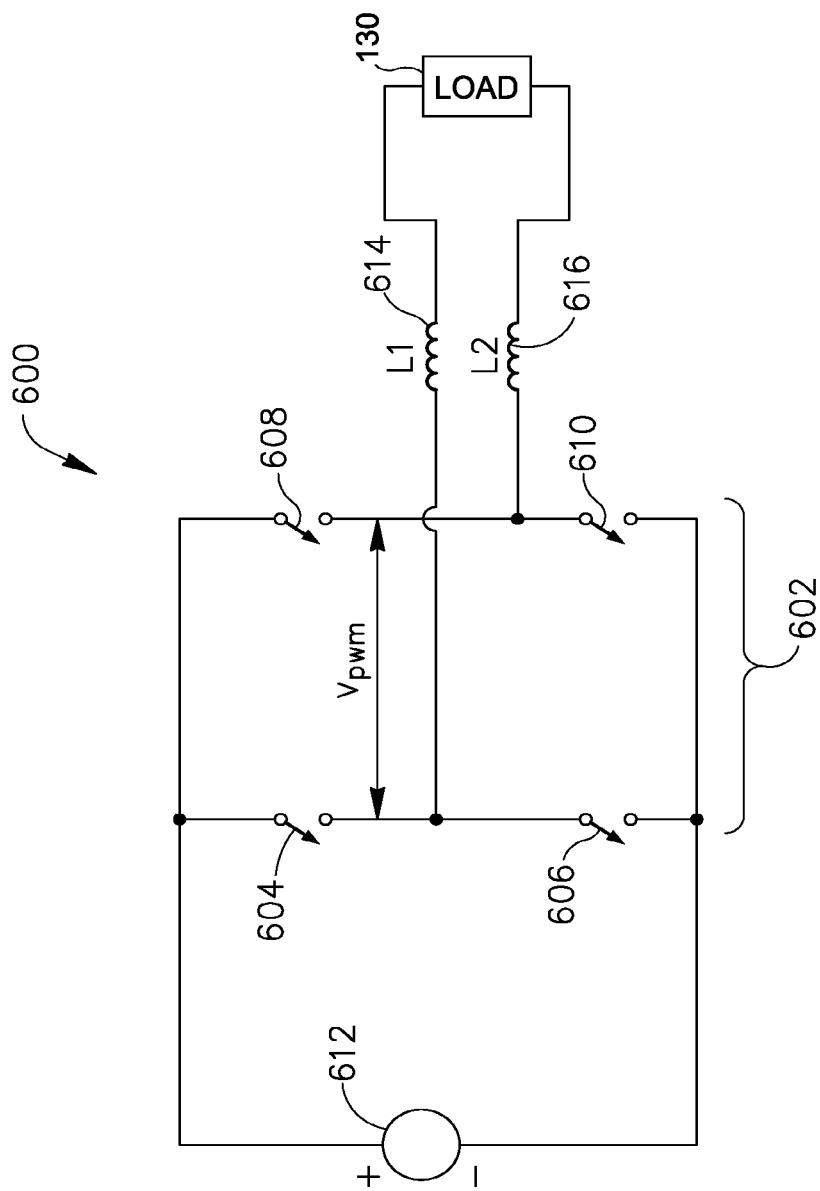
FIG. 6 shows an example schematic of another inverter.

An illustrative example of such a device that may be configured for such performance is provided in FIG. 6, which shows a schematic of a single idealized inverter 600 comprising a DC input source 612; an H-bridge 602 comprising switches 604 through 610; and an output filter comprising inductors 614 (L1), 616 (L2) having a total filter inductance Lf=L1+L2. The inverter 600 may operate in a tri-level PWM mode of operation, as discussed previously with reference to FIGS. 4A through 4D, and the switches in each inverter 600 are controlled (by a controller, not shown) at a switching frequency, $f_s$, to generate a PWM voltage, $V_{pwm}$, at the output of the H-bridge. The PWM voltage may include a fundamental component at an AC load frequency $f_l$=60 Hz.

Figure 7A:
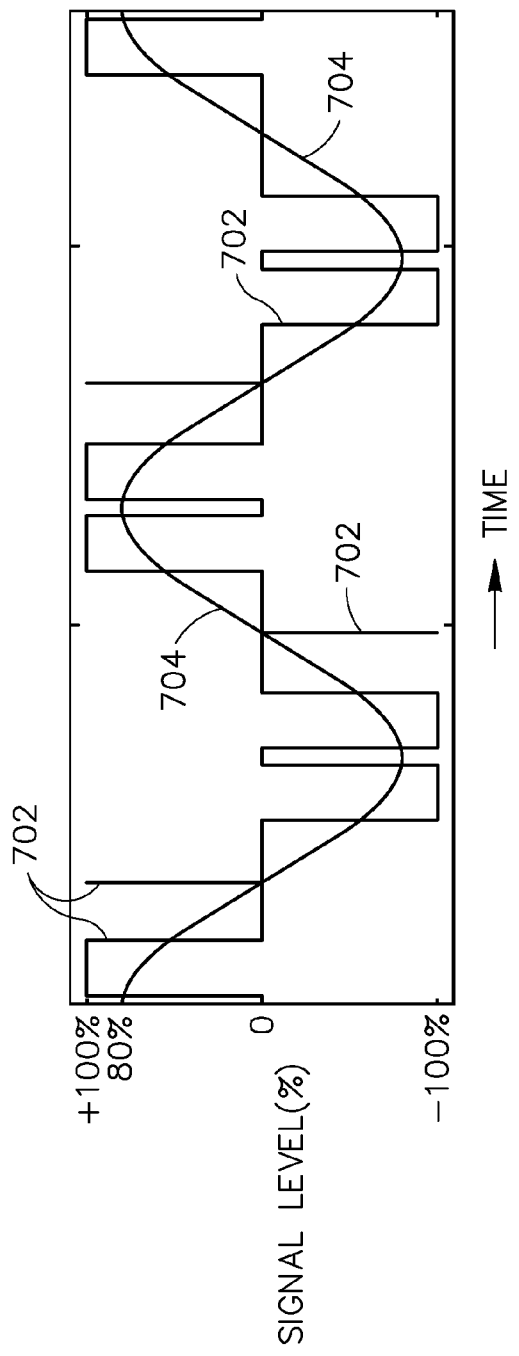
FIGS. 7A and 7B show example waveforms for the inverter of FIG. 6 operating at a switching frequency of 180 Hz.
Figure 7B:
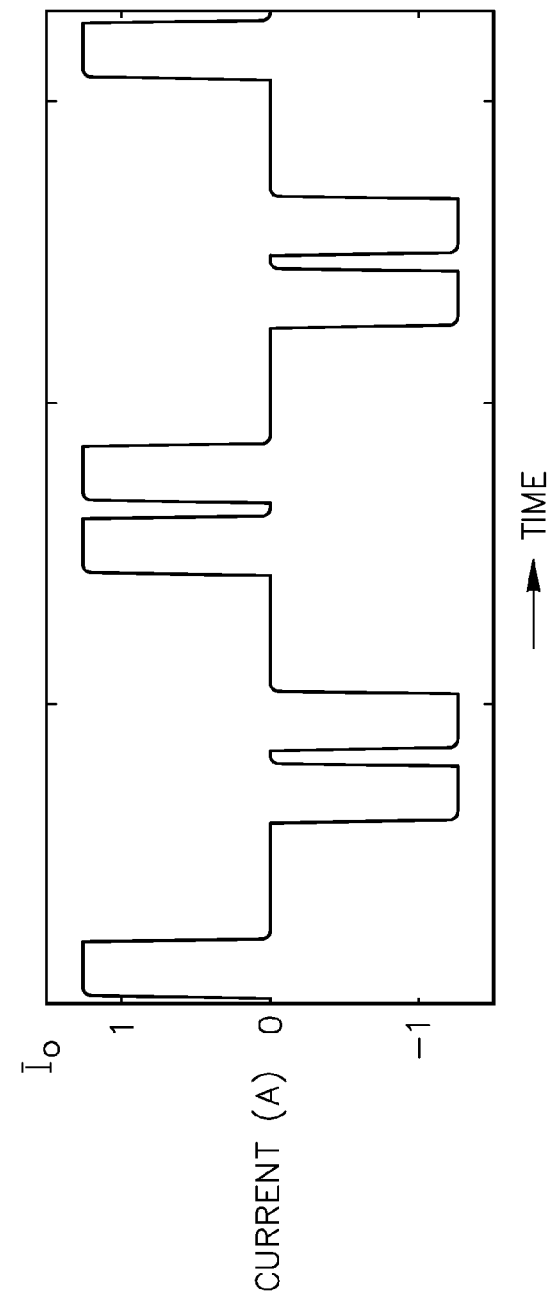

FIGS. 7A and 7B show example simulation waveforms for the inverter 600 of FIG. 6 operating at a relatively low switching frequency, $V_{in}$=300 VDC, $f_s$=180 Hz; FIGS. 8A and 8B show example simulation waveforms for the inverter 600 of FIG. 6 operating at a relatively high, conventional, switching frequency, $f_s$=10 kHz. In the simulation waveforms of 7A through 8B the total filter inductance is 10 mH. FIGS. 7A and 8A each show a respective 60 Hz cosine modulation signal 700 equal to 80% of the DC input source voltage and a respective voltage, $V_{pwm}$ (702, FIG. 7A; 800, FIG. 8A) at the H-bridge 602 output. In FIGS. 7A and 7B, the waveforms are scaled in percent relative to the example DC input voltage (Vin=300 VDC).

FIGS. 7B and 8B show the output current $I_o$ of the inverter 600 in amperes, corresponding to the waveforms shown, respectively, in FIGS. 7A and 8A. In one example, the tri-level waveforms of FIGS. 7B and 8B may be generated by comparing the modulation signal to a pair of triangular carrier waveforms (not shown), such as those described above and shown as waveforms 402, 404 in FIG. 4A. at the respective inverter switching frequency, each triangular carrier waveform being out of phase with the other by ½ cycle at the switching frequency, as previously described. The time period shown in FIGS. 8A and 8B (¹⁄₁₂₀th second) is one-half of that used in FIGS. 7A and 7B (¹⁄₆₀th second) owing to the difficulty associated with visually discerning switching artifacts at the higher switching frequency.

Calculated harmonic distortion may be defined as the ratio of the rms value of the sum of all harmonic components at multiples of the utility frequency to the rms value of the fundamental component at the load frequency. For the inverter 600 operated in the manner shown in FIGS. 7A and 7B, the calculated harmonic distortion is 41.4%. For the inverter 600 operated in the manner described in FIGS. 8A and 8B the calculated harmonic distortion is 1.4%. Because of its higher switching frequency, the current delivered by the inverter 600 operation in FIGS. 8A and 8B ($f_s$=10 k Hz) exhibits relatively much lower distortion than the current delivered by the inverter 600 operation shown in FIGS. 7A and 7B ($f_s$=180 Hz). Whereas, in some applications, the inverter operation of FIGS. 8A and 8B may be acceptable from an output current signal quality viewpoint, the inverter of FIGS. 7A and 7B may not be acceptable according to pre-defined desired performance thresholds.

Figure 9:
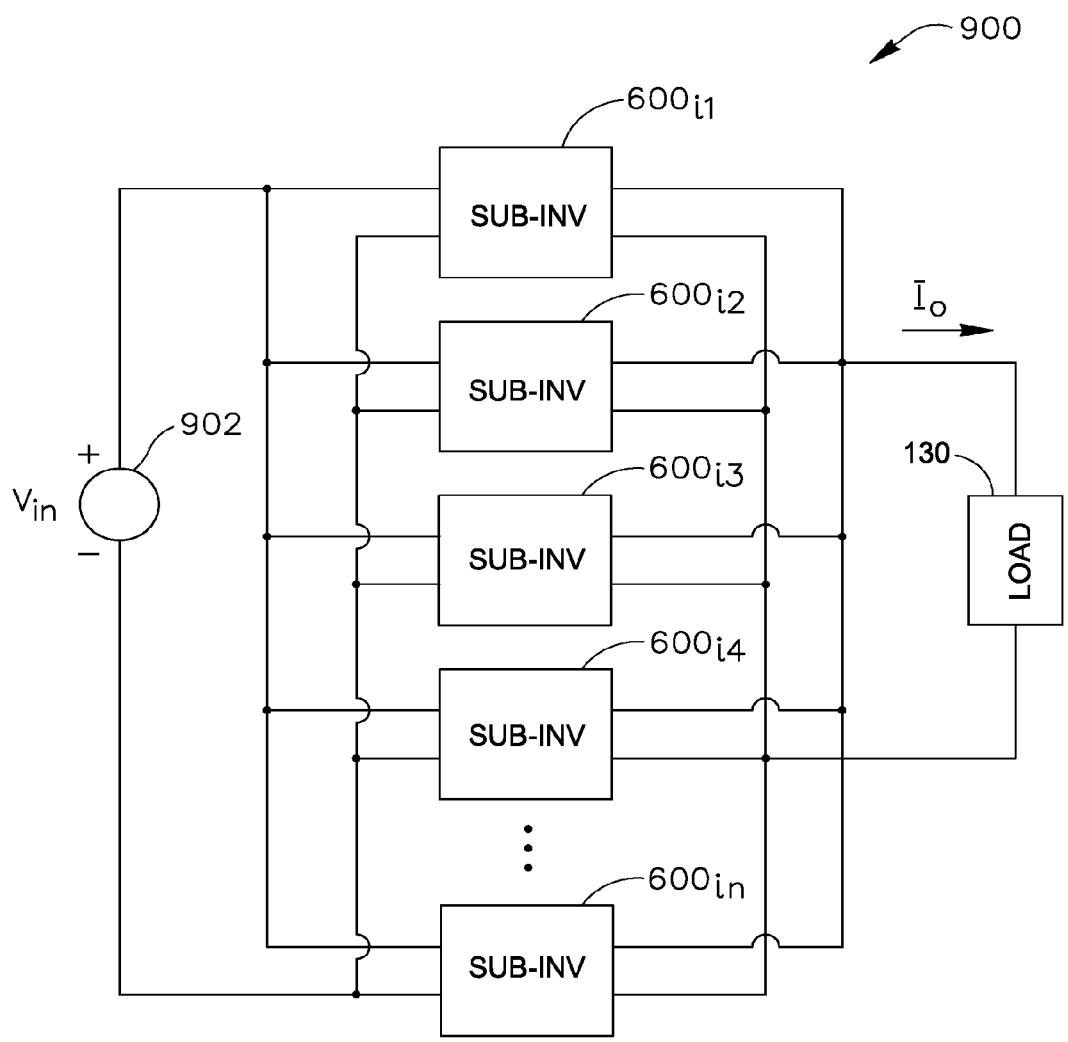
FIG. 9 shows an example array of N inverters.

FIG. 9 shows an array 900 comprising a plurality of sub-inverters 600 individually designated as $600_{i1}$ through $600_{in}$, where n is the number of inverters. Each sub-inverter 600 may be similar to the inverter 600 described with regard to FIG. 6. In FIG. 9, all sub-inverters 600 may operate from the same DC input voltage source 902. FIG. 8 shows operation of the sub-inverters 600 may be the same as those for the individual inverters of FIGS. 9 and 10 (Vin=300 VDC; fs=180 Hz; $f_l$=60 Hz), except that the total output inductance of each sub-inverter (e.g., L=L1+L2, FIG. 9) is reduced to 1 µH in FIG. 9 (a reduction factor of 10,000 compared to the 10 mH inductance used in the simulation of FIGS. 10A and 10B). Each sub-inverter 600 in the array 900 is controlled in a tri-level PWM mode of operation and sub-inverters 600 are interleaved in operation in a manner such as that described with regard to FIGS. 4A through 4D and 5A-5E: For example, the switches 604 through 610 in each sub-inverter 600 may be synchronized to operate at 180 Hz operating frequency but the time of operation of each set of switches is staggered to occur at a unique multiple of 1/n of the operating period, where n is the total number of inverters 600.

FIGS. 10A and 10B show simulation waveforms for an array 900 (FIG. 9) of five sub-inverters 600 (n=5). The waveforms in FIG. 10A are scaled in percent relative to the DC input voltage and the horizontal axis in each figure spans ¹⁄₃₀ second. FIG. 10A shows a 60 Hz modulation signal 1000 equal to 80% of the input source voltage and a hypothetical voltage waveform 1002 that is the sum of the interleaved voltages, $V_{pwm}$, observed at each respective H-bridge output (FIG. 6) in each sub-inverter 700. FIG. 10B shows the array output current, $I_o$, as waveform 1004. Despite the fact that the output inductance in each sub-inverter has been substantially reduced in value (relative to the single 180 Hz inverter used to generate the waveforms of FIGS. 10A and 10B), and despite the relatively low 180 Hz switching frequency of the sub-inverters, the harmonic distortion of the array 900 is only 1.9%, just slightly higher than the harmonic distortion of the conventional inverter operating at 10 KHz and with a much larger output filter inductance (FIGS. 8A and 8B).

FIGS. 11A and 11B show example simulation waveforms for an array 900 of eleven sub-inverters 600 (n=11) electrically coupled in a manner similar to that of the array 100 and operated in a manner described with regard to FIGS. 2-4. The waveforms in FIG. 11A are scaled in percent relative to the dc input voltage and the horizontal axis in each figure spans ¹⁄₃₀ second. FIG. 11A shows a 60 Hz modulation signal 1100 equal to 80% of the input source voltage and a hypothetical voltage waveform 1102 that is the sum of the interleaved voltages, $V_{pwm}$, observed at each respective H-bridge output (FIG. 9) in each sub-inverter 600. FIG. 11B shows the array output current, $I_o$ as waveform 1102. In this array, the harmonic distortion is only 0.37%, substantially better than the harmonic distortion of the conventional inverter operating at 10 KHz with a much larger output filter inductance (FIGS. 8A and 8B).

A sub-inverter, such as the sub-inverter 600, may be scaled down to deliver a relatively small amount of power (e.g., 40 Watts; 5 Watts) for use in relatively larger, interleaved arrays. For example, with reference to FIGS. 12A and 12B, instead of providing a single discrete inverter 1200 (FIG. 12A) to receive and invert the combined power delivered by all of the cells 1202 (e.g., by means of conductor 1203) in a PV panel 1204, several lower-power sub-inverters 1206 may be configured in an interleaved array in which each sub-inverter converts power from a subset of the PV cells 1202 in the panel. FIG. 12B, for example, shows a configuration in which each cell 1202 in the panel 1204 is connected (e.g., by respective conductor 1208) to its own individual sub-inverter 1206. The sub-inverters 1206 of FIG. 12B may, for example, be rated to deliver 5 watts; reducing the power rating of the sub-inverters 1206 may enable the switches and control elements in the sub-inverter 1206 to be fully or partially configured in the form of an integrated circuit. As shown in FIG. 12C, the aggregate power delivered by the sub-inverters 1206 may be combined and delivered to an AC load (e.g. as the AC current $I_g$). In other examples, one or more low power sub-inverters 1206 may be associated with each PV cell. Use of sub-inverters according to the present disclosure may enable configuring distributed inverter arrays that exhibit higher efficiency, availability and reliability (and, in PV array applications, better utilization ratios) than prior art inverters or inverter arrays while achieving pre-defined output signal quality requirements.

Figure 13:
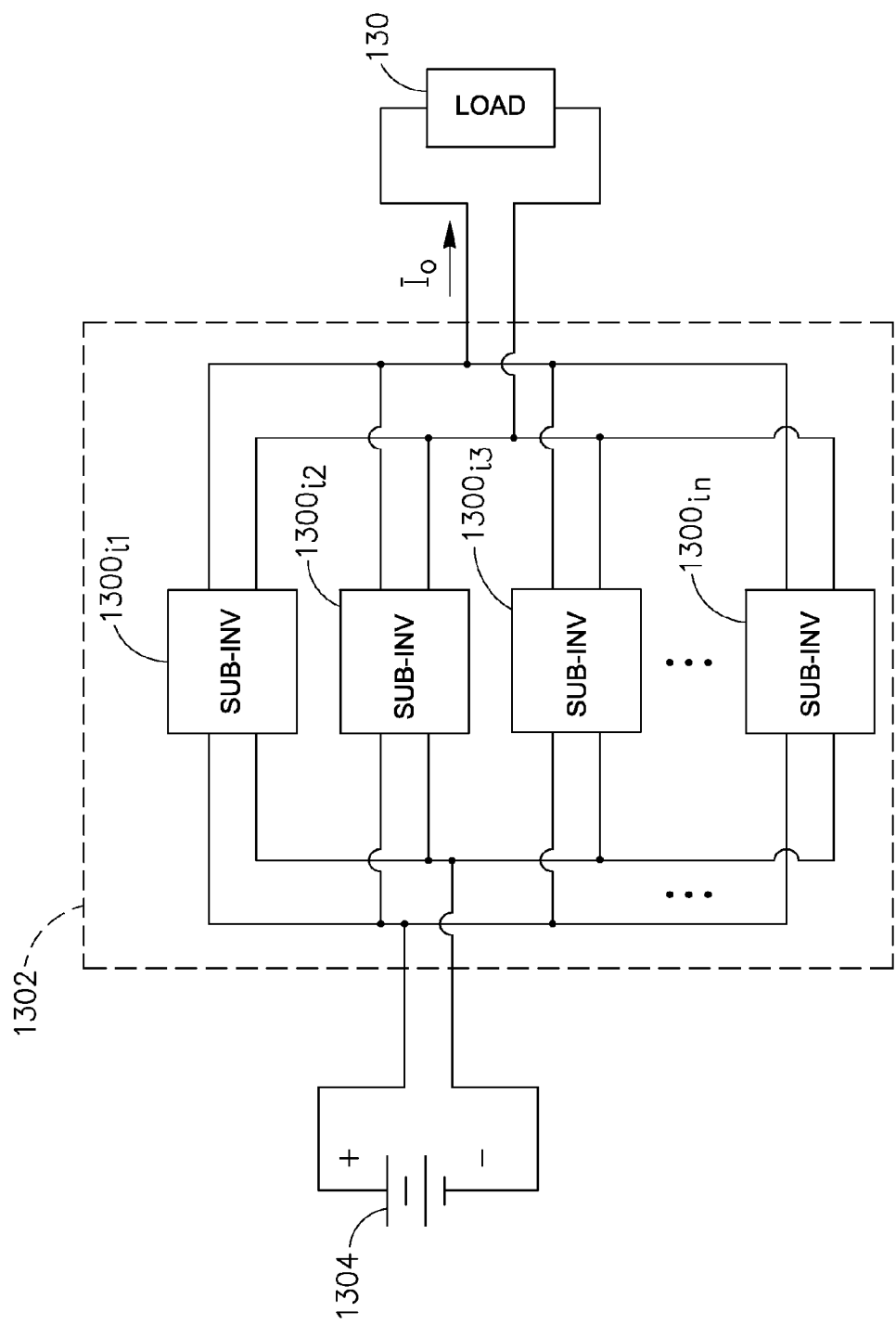
FIG. 13 is an example circuit diagram of a discrete inverter comprising a plurality of sub-inverters.

In another example, shown in FIG. 13, several relatively low power, modular, sub-inverters $1300_{i1}$-$1300_{in}$, where n is the number of inverters, may also be combined in an interleaved array to form a higher power discrete inverter 1302 (such as, e.g., inverter 1200 in FIG. 12A). By appropriate configuration, such a discrete inverter 1302 may, in addition to providing higher efficiency than one configured using a single inverter circuit of equivalent total output power, provide internal N+1 (or higher, e.g., N+M) redundancy so that no single (or multiple) sub-inverter $1300_{i1}$ through $1300_{in}$ failure can cause the discrete inverter 1302 to fail. By scaling down the power rating of the sub-inverters $1300_{i1}$ through $1300_{in}$, a plurality of sub-inverters may be combined to build discrete inverters 1302 exhibiting higher efficiency, availability and reliability than equivalent units comprising a single inverter circuit. Due to the use of the sub-inverters 1300, failure of a single sub-inverter will not result in failure of the inverter 1302.

We define a figure-of-merit providing an inverter array configuration ratio (FMA), where FMA=$F_r$/N, for a inverter or inverter array, where $F_r$=$f_s$/$f_l$ is the normalized frequency of the inverter or inverter array (i.e., the ratio of the switching frequency, $f_s$, of the inverter or the inverter array to the frequency of the sinusoid delivered by the inverter, $f_l$), and N is the number of inverters in the array. In some applications, an inverter array may be required to provide AC power to a fixed-frequency AC load, such as a utility grid, which may operate at fixed frequencies such as 50 Hz or 60 Hz, for example. In one example, a conventional inverter may operate at 10 KHz and deliver a 50 Hz AC output current to a fixed frequency load operating at 50 Hz.: as a stand-alone inverter its FMA=(10,000/50)/1=200; in an array of ten of such inverters the array FMA=(10,000/50)/10=20; in an array of fifty of such inverters the array FMA=(10,000/50)/50=4.

A sub-inverter, such as sub-inverter 600, as previously described, may exhibit an inverter FMA=(180/60)=3 and array FMAs less than (180/60)/5=0.6. Other examples of power conversion apparatus according to the present disclosure may feature higher operating frequencies (e.g., 2 kHz) and array sizes larger than 50 (e.g., an array size of 72, or greater, may be configured for a single PV panel). For some desired level of signal quality, the array size may decrease as operating frequency increases. For example in one example, an array according to the present disclosure for use with a PV panel may comprise 72 sub-inverters, each sub-inverter 600 operating at 180 Hz and delivering a maximum power output of 4 Watts at a utility frequency of 50 Hz. The FMA of such an array is 0.05. Alternatively, an array for use with the same PV panel may include 12 sub-inverters 600, with each sub-inverter 600 operating at 2000 Hz and delivering a maximum power output of 24 Watts at a utility frequency of 50 Hz: the FMA of such an inverter is 40 and the array FMA is 3.33. In general, such arrays may include sub-inverters having $F_r$>1 and FMAs less than 50 and array FMAs less than 4.

Figure 14:
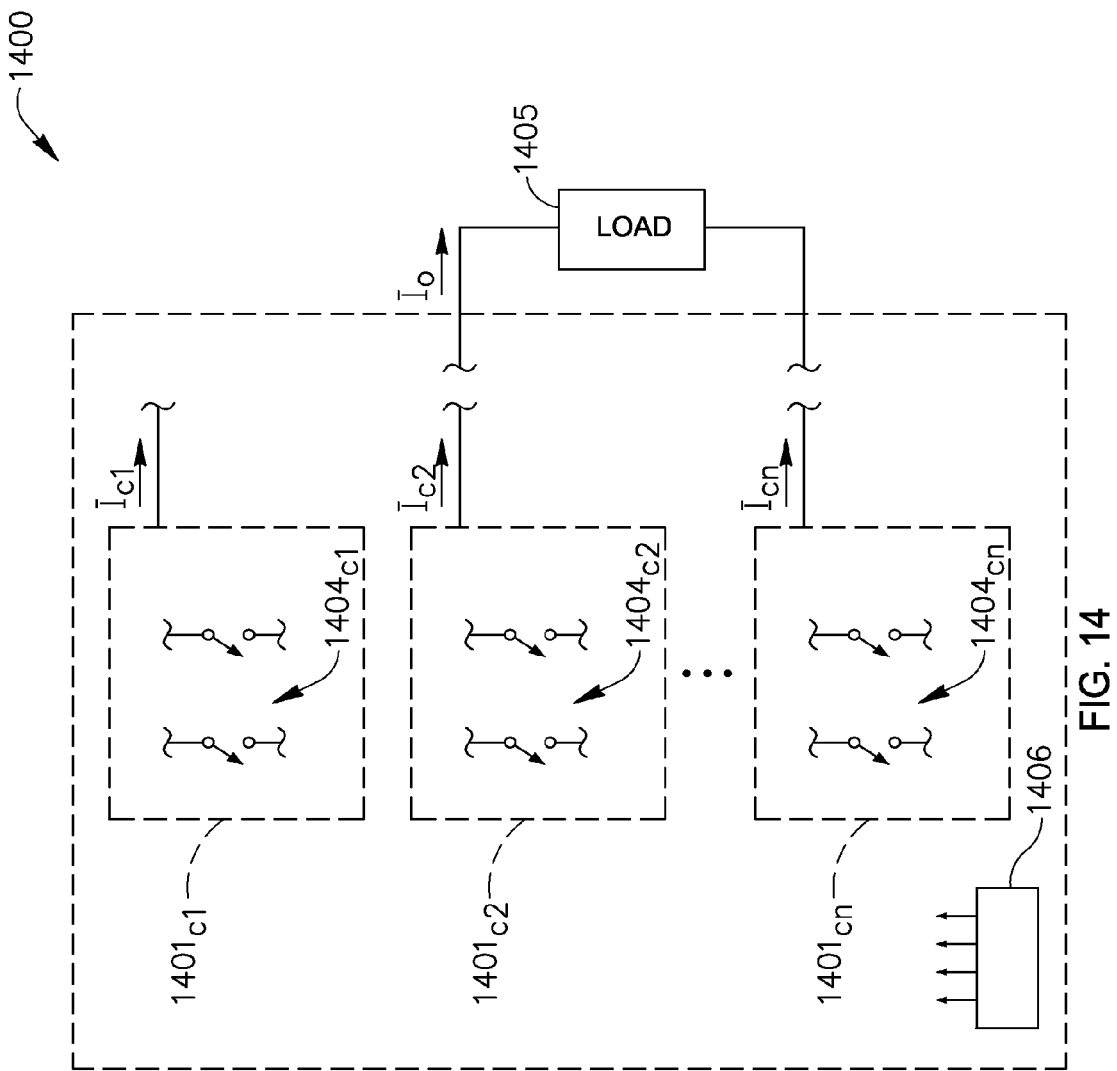
FIG. 14 is an example circuit diagram of a power converter.

In general, as illustrated in FIG. 14, a power converter 1400 may deliver an alternating current, $I_o$, at a load frequency $f_l$. The power converter 1400 includes two or more switching converters (e.g., converters $1401_{c1}$-$1401_{cn}$ where n is the number of converters), each switching converter comprising a set of switches (e.g., switch sets $1404_{c1}$-$1404_{cn}$) and configured to deliver an AC current (e.g., AC currents $I_{c1}$-$I_{cn}$) to an AC load 1405. Each set of switches is configured to operate in a series of switching cycles during which the relative timing and duration of the ON and OFF times of the switches within the set is controlled to control the power delivered by the switching converter. The duration of a switching cycle defines a switching period and a switching frequency, $f_s$, for a switching converter. The power converter 1400 comprises a controller 1406 configured to control the relative timing of the beginning of each respective one of the switching cycles to occur in a staggered, interleaved, fashion during an inverter array operating period, as described earlier. The controller 1406 may be similar in configuration to the controller 201. In some examples the apparatus may be configured to have an FMA ratio that is less than four (where, as discussed above, FMA=$F_r$/N; $F_r$=$f_s$/$f_l$, is the normalized switching frequency and N is the number of switching converters); in some examples the FMA ratio may be less than one. In some examples the switching converters 1401 may be configured to have 1<$F_r$<50; in some examples the switching converters 1401 may be configured to have 1<$F_r$<3. In some examples the power converter 1400 may convert power received from a unipolar source (not shown in FIG. 8) into the AC current $I_o$.

Figure 15:
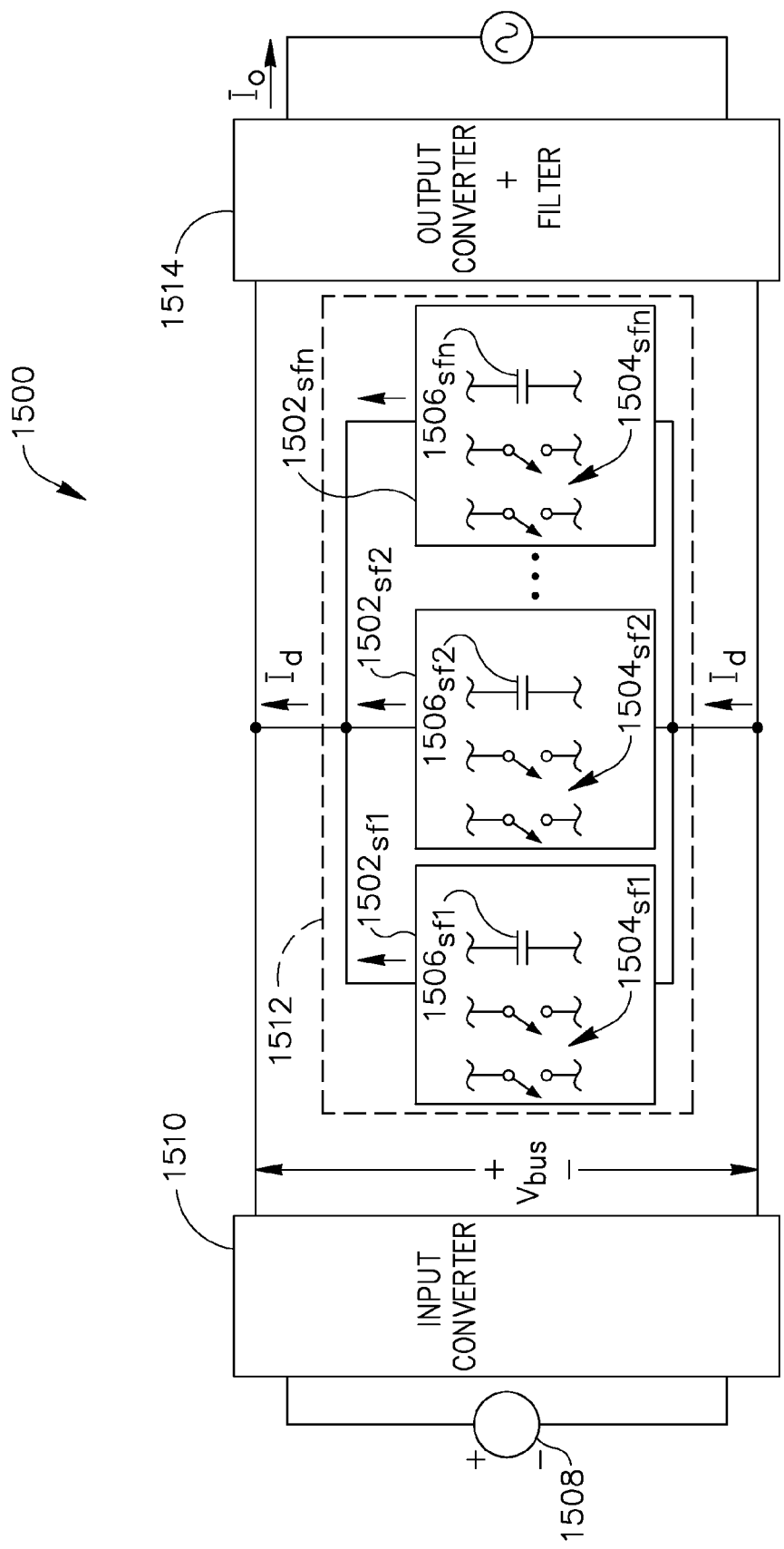
FIG. 15 is an example circuit diagram of an inverter comprising an active filter.

In FIG. 15 an inverter 1500 comprises an active filter 1512 that delivers double-frequency power to the inverter output by delivering a substantially sinusoidal AC current, $I_d$, at twice the load frequency, 2*$f_l$. Inverter 1500 may, for example, be an inverter of the kind shown in FIG. 2. The efficiency of the inverter 1500 is, in part, dependent on the efficiency of the active filter 1512; the signal quality of the current, $I_d$, delivered by the active filter 1512, affects both the inverter output signal quality and the amount of AC current that is reflected back into the input source 1508 (an important factor in PV inverter systems). As shown in FIG. 15, instead of configuring the active filter 1512 as a single active power converter circuit, the filter is configured to comprise several (e.g., more than two) smaller power converters $1502_{sf1}$-$1502_{sfn}$ ("sub-filters"), where n is the number of sub-filters, each sub-filter comprising respective switches $1504_{sf1}$-$1504_{sfn}$, and filter capacitors $1506_{sf1}$-$1506_{sfn}$, and each delivering an AC current, $I_1$, $I_2$ ... $I_n$, that is a fraction of the total double-frequency AC current, $I_d$. As described above, the sub-filters $1504_{sf1}$-$1504_{sfn}$ may be operated in a staggered, interleaved, fashion at a relatively low sub-filter switching frequency, $f_s$, where $f_s$>2*$f_l$, and they may also be controlled to deliver substantially the same amount of power. The advantages of this approach may include higher efficiency, availability and reliability than can be achieved with a single active filter, also as described above.

Figure 16:
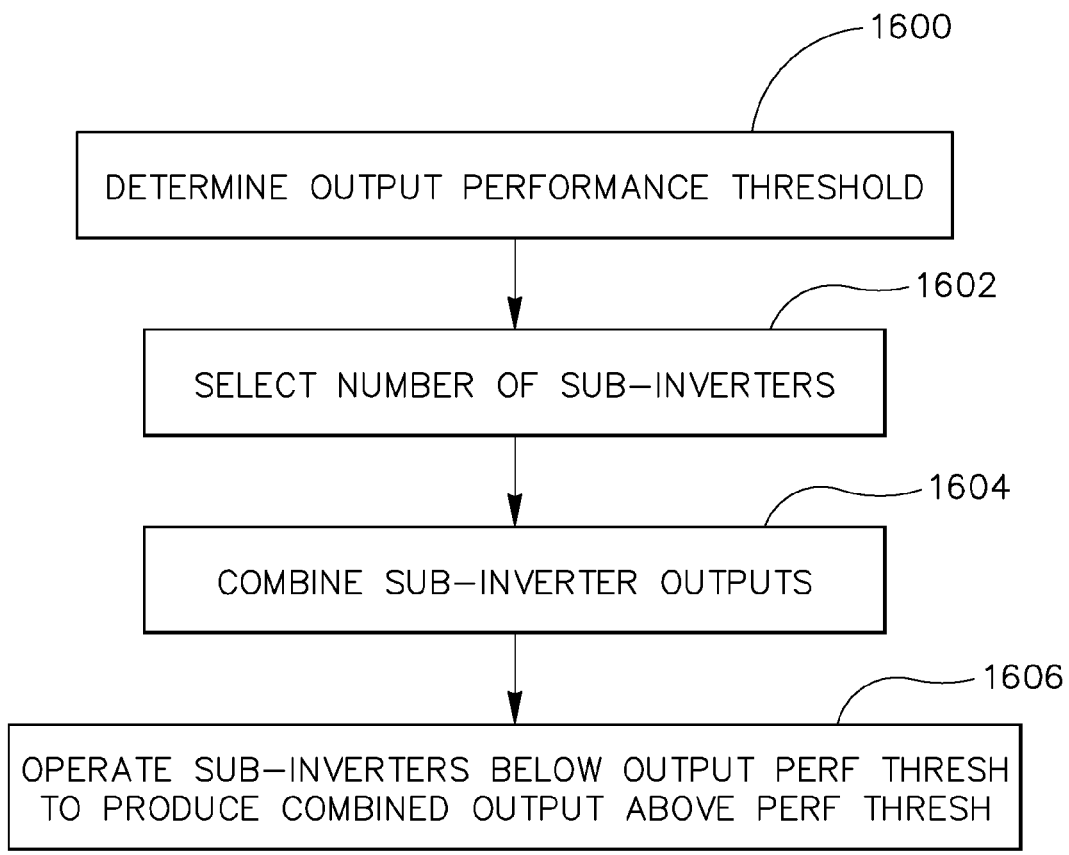
FIG. 16 shows an example operational flow diagram of an array of sub-inverters.

FIG. 16 is an example operational flow diagram of operating the array 900 of DC-AC sub-inverters 600. In one example, one or more output performance thresholds of an output of the array may be selected (block 1600). In one example, the output threshold may relate to output power and/or efficiency or some other performance metric of the array. A number of sub-inverters 600 may be selected (1602) to be included in the array. Outputs of the sub-inverters 600 may be combined to provide a single output (1604). Each sub-inverter 600 may be operated to individually perform below the performance threshold while producing a single combined output to perform above the output threshold (1606). In one example, the sub-inverters 600 may be controlled in an interleaved arrangement using the figure of merit FMA=$F_r$/N.

Figure 17:
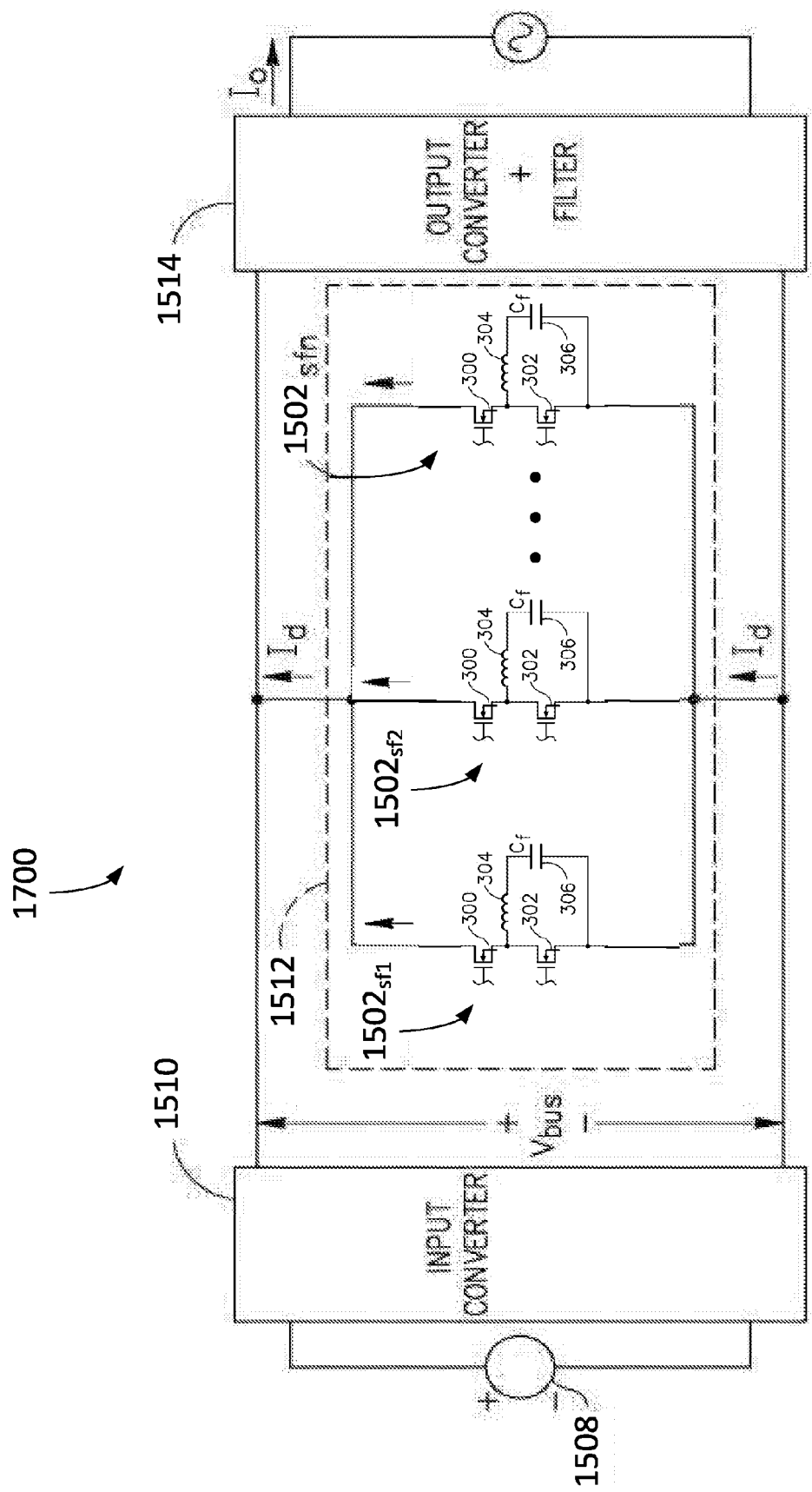
FIG. 17 is an example circuit diagram of an inverter comprising an active filter.

In FIG. 17, an inverter 1700 comprises an active filter 1512 that delivers double-frequency power to the inverter output by delivering a substantially sinusoidal AC current, $I_d$, at twice the load frequency, 2*$f_l$. The inverter 1700 may, for example, be an inverter of the kind shown in FIGS. 2, 3A, and 15.

The apparatus and methods described herein may be implemented as discrete circuits or in the form of software code and/or logical instructions that are processed by a microprocessor, digital processor, digital signal processing (DSP) or other means, or any combination thereof. The logical processes may run concurrently or sequentially with respect to each other or with respect to other processes, such as measurement processes and related calculations. The apparatus and methods may be implemented in mixed-signal circuitry; in circuitry comprising mixed-signal circuitry comprising a digital processor core; or in circuitry comprising a combination of mixed-signal circuitry and a separate digital signal processor. They may be implemented as an integrated circuit or a hybrid device. There may also be additional logical processes that may not be shown, such as, e.g., safety and protection mechanisms; timing and frequency generation mechanisms; and hardware and processes related to regulatory requirements. Variable and other values may be stored in read-only or re-programmable nonvolatile memory or other storage media. Communication means may also be incorporated into the apparatus as a means of downloading commanded values or other operating information to the apparatus and/or for uploading operating information from the apparatus to other equipment.

There is a plurality of advantages of the present disclosure arising from the various features of the apparatuses, circuits, and methods described herein. It will be noted that alternative examples of the apparatuses, circuits, and methods of the present disclosure may not include all of the features described yet still benefit from at least some of the advantages of such features. Those of ordinary skill in the art may readily devise their own implementations of the apparatuses, circuits, and methods that incorporate one or more of the features of the present disclosure and fall within the spirit and scope of the present invention as defined by the appended claims.

I claim:

1. A power inverter configured to receive power from a photovoltaic panel comprising a plurality of solar cells and to deliver an alternating current (AC) power, at a first frequency, fu, to a power grid, the power inverter comprising:
    a controller having a processor and a memory;
    an input converter having (i) an input configured to receive a DC input from the photovoltaic panel and (ii) an output coupled to a DC power bus, the input converter configured to supply a DC output to the DC power bus;
    an output converter (i) having an input coupled to the DC power bus and (ii) configured to deliver the AC power at an AC output; and
    an active filter electrically connected to the DC power bus and in communication with the controller, the active filter comprising:
        at least two switching converters electrically coupled in parallel at a first common node and a second common node, wherein each switching converter of the at least two switching converters includes:
            a first switch having a first terminal electrically coupled to the first common node and a second terminal electrically coupled to an internal node of the corresponding switching converter;
            a second switch having a first terminal electrically coupled to the internal node and a second terminal electrically coupled to the second common node; and
            at least one corresponding energy storage device electrically coupled to the internal node,
        wherein each said switching converter is configured to supply a first AC power with a fundamental frequency at twice the first frequency to and absorb a second AC power with a fundamental frequency at twice the first frequency from the DC power bus using the at least one corresponding energy storage device of the corresponding switching converter,
        wherein each of the first switch and the second switch is configured to operate in a series of switching cycles during which the relative timing and duration of the on and off times of each of the first switch and the second switch is configured to be controlled by the controller to control the AC power delivered by each said switching converter, and
        wherein the controller is configured to control the switching cycles of the at least two plurality of switching converters to be interleaved with respect to one another.

2. The power inverter of claim 1, wherein each said switching converter is operated at a ratio of FMA=Fr/N that is less than four, wherein fu is the first frequency, wherein fs is a switching frequency for each said switching converter, and wherein Fr=fs/(2*fu) is a normalized switching frequency of the plurality of switching converters and N is a number of switching converters.

3. The power inverter of claim 1, wherein each switching converter of the plurality of switching converters receives power from a single corresponding DC source.

4. The power inverter of claim 1, wherein each said switching converter is configured to operate in a tri-level pulse width modulation (PWM) mode of operation.

5. The power inverter of claim 2, wherein FMA is less than 1.

6. The power inverter of claim 2, wherein Fr is greater than one and less than fifty.

7. The power inverter of claim 2, wherein Fr is greater than one and less than three.

8. The power inverter of claim 3, wherein the single corresponding DC source is a photovoltaic (PV) module comprising a number M PV cells and the power inverter comprises a number N switching converters.

9. The power inverter of claim 8, wherein M equals seventy-two.

10. The power inverter of claim 9, wherein N equals seventy-two.

11. An apparatus configured to deliver an alternating current (AC) power at a first frequency to a power grid, the apparatus comprising:
    a controller having a processor and memory;
    a photovoltaic panel comprising a plurality of solar cells; and
    a plurality of power inventers in communication with the controller, wherein each power inverter of the plurality of power inverters includes a direct current (DC) input connected to a different subset of solar cells of the plurality of solar cells and comprises an active filter connected to a DC power bus of the corresponding power inverter, each active filter comprising:
        at least two switching converters electrically coupled in parallel at a first common node and a second common node, wherein each switching converter of the at least two switching converters includes:
            a first switch having a first terminal electrically coupled to the first common node and a second terminal electrically coupled to an internal node of the corresponding switching converter;

a second switch having a first terminal electrically coupled to the internal node and a second terminal electrically coupled to the second common node; and at least one corresponding energy storage device electrically coupled to the internal node, wherein each switching converter is configured to supply a first AC power with a fundamental frequency at twice the first frequency to and absorb a second AC power with a fundamental frequency at twice the first frequency from the DC power bus using the at least one corresponding energy storage device of the corresponding switching converter, wherein each of the first switch and the second switch is configured to operate in a series of switching cycles, the duration of which defines a switching period and a switching frequency for the corresponding switching converter and is configured to be controlled by the controller to control the AC power delivered by each said switching converter; and wherein the controller is configured to control the switching cycles of the at least two switching converters to be interleaved with respect to one another.

12. The apparatus of claim 11, wherein each power inverter of the plurality of power inverters comprises:

an input converter having an input configured to receive a DC input from the corresponding different subset of solar cells and an output coupled to the DC power bus, the input converter configured to supply a DC output to the DC power bus; and an output converter having an input coupled to the DC power bus and configured to deliver the AC power at an AC output.

13. The apparatus of claim 11, wherein each of the first switch and the second switch is configured to operate in a series of switching cycles during which the relative timing and duration of the on and off times of each switch of the first switch and the second switch is configured to be controlled by the controller to control AC power delivered by each switching converter.

14. The apparatus of claim 11, wherein each said power inverter has the DC current input connected to a different solar cell of the plurality of solar cells.

15. The apparatus of claim 11, wherein the controller and the first switch and the second switch of each of the at least two switching converters are incorporated in an integrated circuit.

16. The apparatus of claim 11, wherein each said power inverter is configured to be a current-sourcing inverter for delivering a fraction of a total AC current delivered to the power grid.

17. The apparatus of claim 11, wherein each said switching converter is configured to operate in a tri-level pulse width modulation (PWM) mode of operation.

18. The apparatus of claim 11, wherein each said switching converter is operated at a ratio of $FMA=Fr/N$ that is less than four, wherein fu is the first frequency of current delivered by each switching converter, fs is the switching frequency, $Fr=fs/(2*fu)$ is a normalized switching frequency of the switching converters, and N is a number of switching converters included in the active filter.

19. The apparatus of claim 11, wherein N is a number of switching converters included in the active filter, T is the switching period, and the controller is configured to control the plurality of inverters to stagger a beginning of each successive switching cycle to occur substantially T/N seconds after a beginning of a preceding switching cycle of the switching converters.

20. The apparatus of claim 16, wherein each power inverter delivers a substantially equal fraction of the total AC current delivered to the power grid.

21. A method of operating a plurality of power inverters each of which is a direct current (DC)-alternating current (AC) power inverter to deliver an AC power at a first frequency to a power grid, the method comprising:

receiving, by each power inverter of the plurality of power inverters, a corresponding DC input from a corresponding subset of solar cells of a photovoltaic panel, wherein each power inverter comprises an active filter connected to a DC power bus of the corresponding power inverter, wherein each active filter comprises at least two switching converters electrically coupled in parallel at a first common node and a second common node, wherein each switching converter of the at least two switching converters comprises (i) a first switch having a first terminal electrically coupled to the first common node and a second terminal electrically coupled to an internal node of the corresponding switching converter, (ii) a second switch having a first terminal electrically coupled to the internal node and a second terminal electrically coupled to the second common node, and (iii) at least one energy storage device electrically coupled to the internal node; and controlling switching cycles of an active filter of each said power inverter in an interleaved manner to supply a first AC power with a fundamental frequency at twice the first frequency to and absorb a second AC power with a fundamental frequency at twice the first frequency from a corresponding DC power bus of a corresponding power inverter using the at least one energy storage device of the corresponding active filter, wherein each of the first switch and the second switch is configured to operate in a series of switching cycles, the duration of which defines a switching period and a switching frequency for the corresponding switching converter and is configured to be controlled by the controller to control the AC power delivered by each said switching converter.

22. The method of claim 21, further comprising providing a combined AC output of the plurality of power inverters to the power grid.

23. The method of claim 21, wherein controlling the switching cycles of the active filter further comprises sequentially controlling a beginning of a switching cycle in said each power inverter to occur at a different time during the operating period of the plurality of power inverters, such that each switching cycle is to occur substantially at $1/(fs*N)$ seconds after a beginning of a preceding switching cycle, wherein fs is the switching frequency and N is a number of power inverters included in the plurality of power inverters.

24. The method of claim 21, wherein the plurality of power inverters are embodied as an array of power inverters.

25. The method of claim 21, wherein controlling the switching cycles of the active filter comprises operating the switching converters in a tri-level pulse width modulation (PWM) mode of operation.

26. The method of claim 22, wherein providing the combined AC output comprises controlling each said power inverter to deliver substantially a same amount of power to the power grid as each other said power inverter.

* * * * *